(12) United States Patent
Tang et al.

(10) Patent No.: US 11,789,237 B2
(45) Date of Patent: Oct. 17, 2023

(54) OPTICAL IMAGING SYSTEM

(71) Applicant: ZHEJIANG SUNNY OPTICS CO., LTD., Yuyao (CN)

(72) Inventors: Mengna Tang, Yuyao (CN); Jianke Wenren, Yuyao (CN); Fujian Dai, Yuyao (CN); Liefeng Zhao, Yuyao (CN)

(73) Assignee: ZHEJIANG SUNNY OPTICS CO., LTD., Yuyao (CN)

( * ) Notice: Subject to any disclaimer, the term of this patent is extended or adjusted under 35 U.S.C. 154(b) by 350 days.

(21) Appl. No.: 17/144,977

(22) Filed: Jan. 8, 2021

(65) Prior Publication Data
US 2021/0255426 A1  Aug. 19, 2021

(30) Foreign Application Priority Data
Feb. 18, 2020 (CN) .......................... 202010100691.8

(51) Int. Cl.
*G02B 13/00* (2006.01)
*G02B 27/00* (2006.01)

(52) U.S. Cl.
CPC ....... *G02B 13/004* (2013.01); *G02B 27/0025* (2013.01)

(58) Field of Classification Search
CPC ................................ G02B 13/004; G02B 9/34
See application file for complete search history.

(56) References Cited

U.S. PATENT DOCUMENTS

2015/0378129 A1\* 12/2015 Yuza .................... G02B 13/004
359/715
2020/0200997 A1\* 6/2020 Yeh .......................... G02B 9/34

\* cited by examiner

*Primary Examiner* — Joseph P Martinez
(74) *Attorney, Agent, or Firm* — Birch, Stewart, Kolasch & Birch, LLP

(57) ABSTRACT

The present application discloses an optical imaging system, comprising, in order from an object side to an image side along an optical axis: a planar glass, a first lens having a positive focal power, a second lens having a negative focal power and a plurality of subsequent lenses having a respective focal power, wherein the maximum field of view FOV of the optical imaging system satisfies FOV≥40°; and a radius of curvature R3 of an object side surface of the second lens and a radius of curvature R4 of an image side surface of the second lens satisfy −0.5<R3/R4<0.

19 Claims, 18 Drawing Sheets

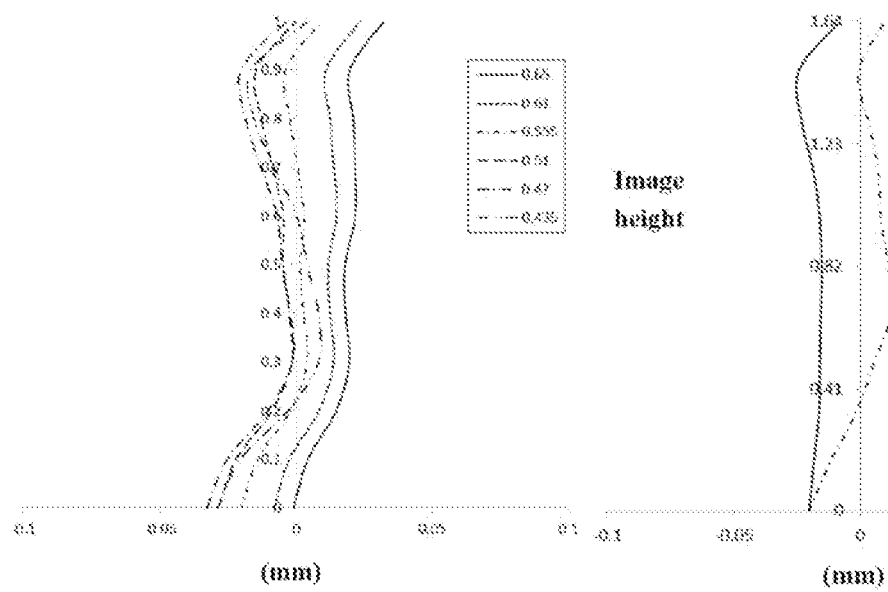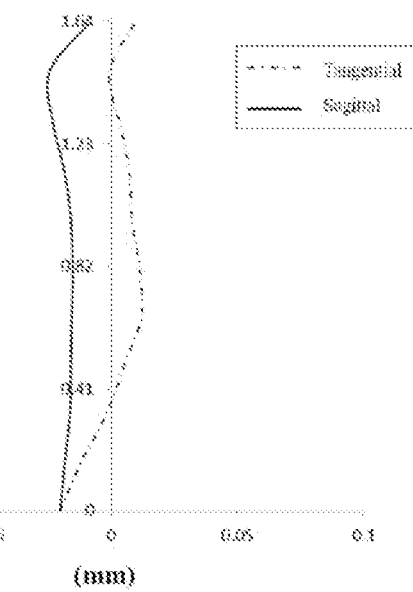
Fig. 4A    Fig. 4B
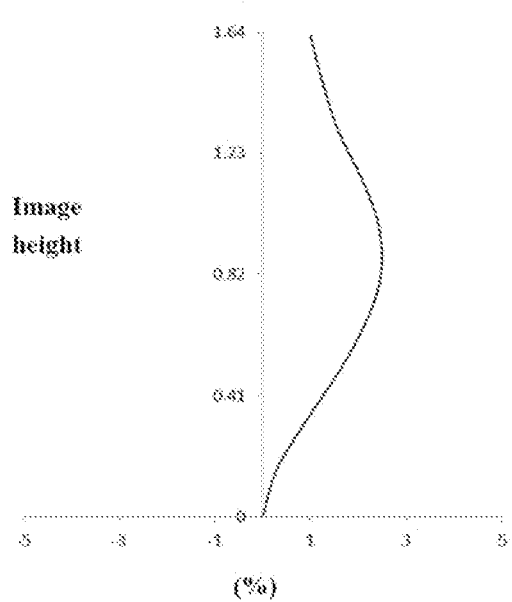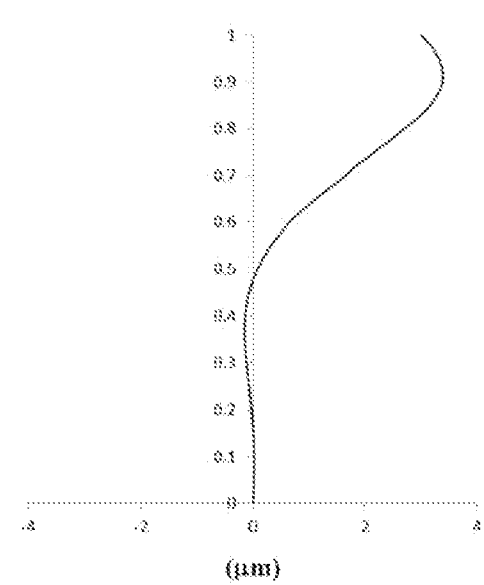
Fig. 4C    Fig. 4D

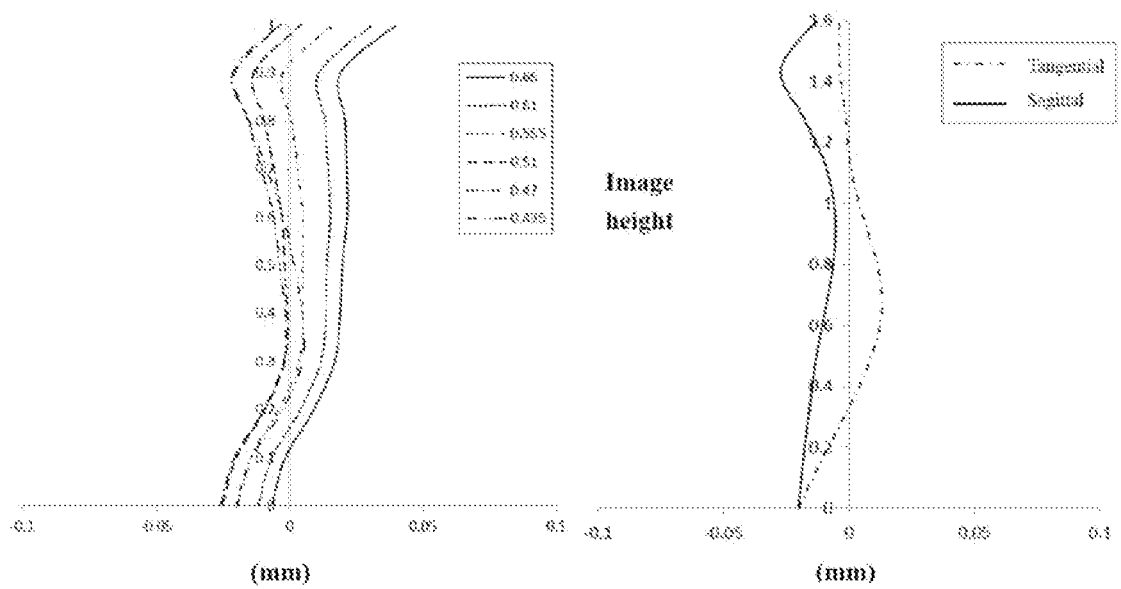
Fig. 8A
Fig. 8B
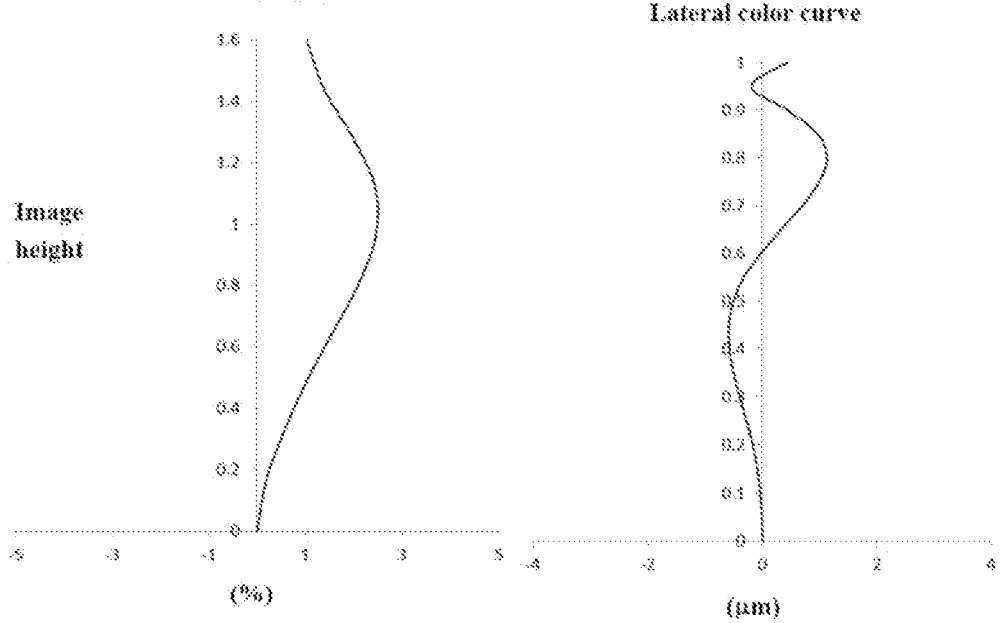
Fig. 8C
Fig. 8D

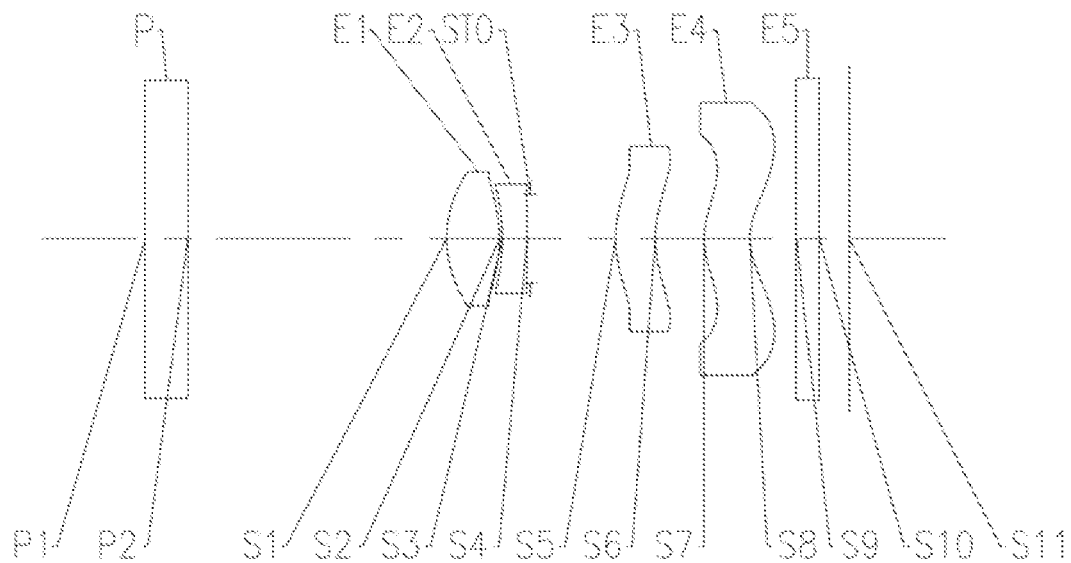
Fig. 9
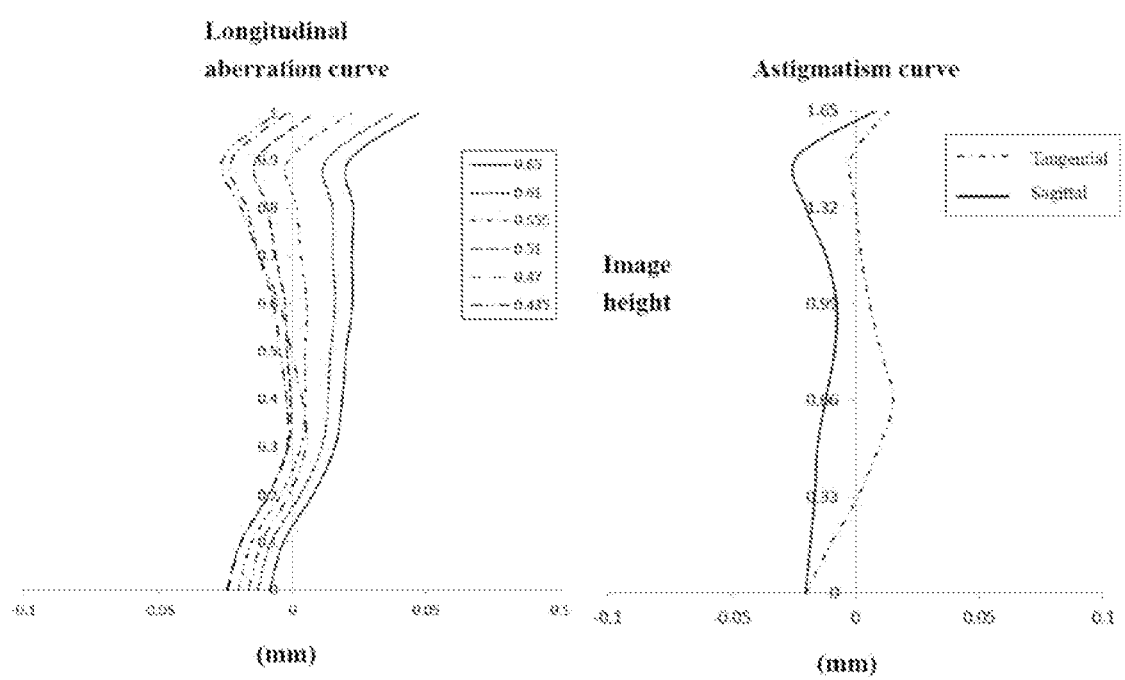
Fig. 10A
Fig. 10B

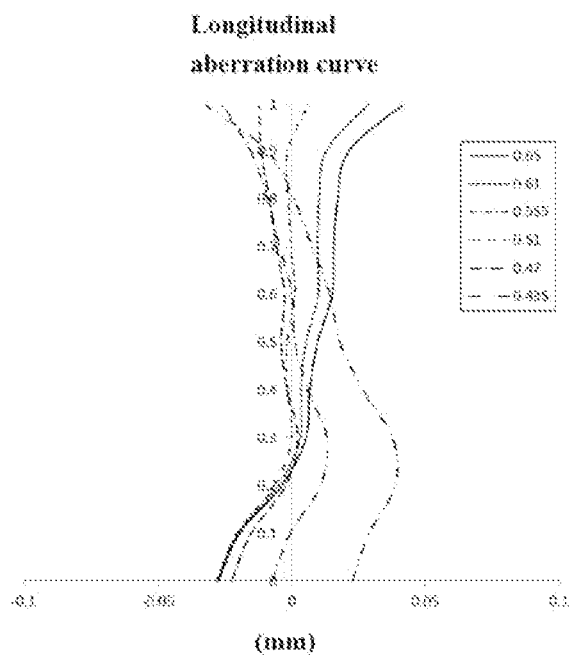
Fig. 24A
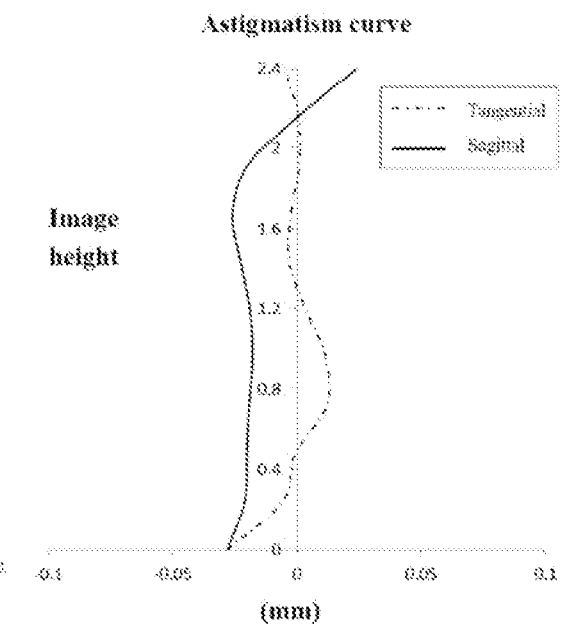
Fig. 24B
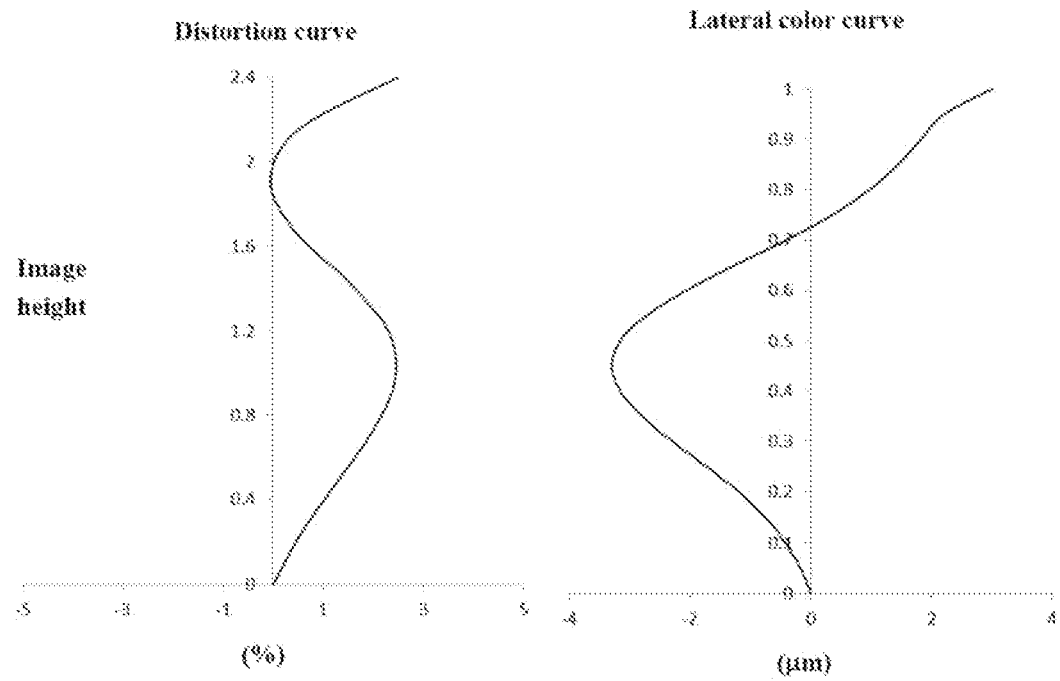
Fig. 24C
Fig. 24D

OPTICAL IMAGING SYSTEM

CROSS-REFERENCE TO RELATED APPLICATIONS

The present application claims the priority of Chinese patent application No. 202010100691.8, filed on Feb. 18, 2020, which is hereby incorporated by reference in its entirety.

TECHNICAL FIELD

The present application relates to an optical imaging system, and more specifically, to an optical imaging system including four or five lenses.

BACKGROUND

As major mobile phone manufacturers regard capturing capability as one of the most important performance indicators of mobile phones, telephoto, wide-angle, macro, large aperture and large image plane lenses and so forth have currently become standard equipment for mobile phone cameras.

In the field of microscopic lenses, due to the need for microscopic capturing, they usually lay emphasis on capturing clear local details of subjects, and the design of the field of view of a microscope lens is often ignored. Therefore, it is a big challenge in terms of optical designs how to ensure that local details of a subject are clearly captured while taking into account the design of the microscope lens to have a larger field of view, so that it can obtain a wider view range, so as to provide a better sense of use.

SUMMARY

The present application provides an optical imaging system suitable for portable electronic products, which can at least or partially solve at least one of the above-mentioned shortcomings in the prior art, for example, an optical imaging system suitable for built-in microscopic capturing lens assembly.

The present application provides an optical imaging system, comprising, in order from an object side to an image side along an optical axis: a planar glass; a first lens having a positive focal power; a second lens having a negative focal power; and a plurality of subsequent lenses having a respective focal power.

In one implementation, the maximum field of view FOV of the optical imaging system may satisfy FOV≥40°.

In one implementation, a radius of curvature R3 of an object side surface of the second lens and a radius of curvature R4 of an image side surface of the second lens may satisfy −0.5<R3/R4<0.

In one implementation, a distance TL from a subject to an imaging plane of the optical imaging system on the optical axis may satisfy TL≤7.0 mm.

In one implementation, the maximum image height ImgH of the optical imaging system and the maximum height Do of the subject may satisfy ImgH/Do≥1.0.

In one implementation, an entrance pupil diameter EPD of the optical imaging system and the maximum image height ImgH of the optical imaging system may satisfy 0.5<EPD/ImgH<1.0.

In one implementation, a total effective focal length f of the optical imaging system and the entrance pupil diameter EPD of the optical imaging system may satisfy f/EPD<1.2.

In one implementation, the total effective focal length f of the optical imaging system and a distance BFL from an image side surface of a lens closest to an imaging plane of the optical imaging system to the imaging plane on the optical axis may satisfy f/BFL≥1.0.

In one implementation, a radius of curvature R1 of an object side surface of the first lens and a radius of curvature R2 of an image side surface of the first lens may satisfy −1.0≤R1/R2≤−0.5.

In one implementation, the total effective focal length f of the optical imaging system, and a combined focal length f12 of the first lens and the second lens may satisfy 0.3≤f/f12<1.0.

In one implementation, a distance To from the subject to the object side surface of the first lens on the optical axis and the entrance pupil diameter EPD of the optical imaging system may satisfy 1.8≤To/EPD<3.0.

In one implementation, the plurality of subsequent lenses of the optical imaging system may comprise a third lens and a fourth lens, and a spacing distance T34 between the third lens and the fourth lens on the optical axis and a center thickness CT4 of the fourth lens on the optical axis may satisfy 0.3≤T34/CT4<2.0.

In one implementation, the plurality of subsequent lenses of the optical imaging system may comprise a third lens and a fourth lens, and a radius of curvature R5 of an object side surface of the third lens and a radius of curvature R6 of an image side surface of the third lens may satisfy 0<R5/|R6|<1.5.

In one implementation, the plurality of subsequent lenses of the optical imaging system may comprise a third lens and a fourth lens, and an effective focal length f2 of the second lens and a radius of curvature R5 of an object side surface of the third lens may satisfy −3.0<f2/R5<0.

In one implementation, the plurality of subsequent lenses of the optical imaging system may comprise a third lens, a fourth lens and a fifth lens, and an effective focal length f4 of the fourth lens and an effective focal length f5 of the fifth lens may satisfy −1.5<f4/f5≤−1.0.

In one implementation, the plurality of subsequent lenses of the optical imaging system may comprise a third lens, a fourth lens and a fifth lens, and the total effective focal length f of the optical imaging system, a radius of curvature R7 of an object side surface of the fourth lens and a radius of curvature R8 of an image side surface of the fourth lens may satisfy 1.0<f/R7+f/R8<2.5.

In the present application, four or five lenses are adopted. The focal power, surface profile and center thickness of each lens, the on-axis distances between the respective lenses, and the like, are reasonably assigned, so that the optical imaging lens described above has at least one of the beneficial effects such as microscopic capturing, large field of view, large aperture, high imaging quality, miniaturization and so on.

BRIEF DESCRIPTION OF THE DRAWINGS

Other features, objectives and advantages of the present application will become more apparent from the following detailed description of non-limiting implementations in conjunction with the drawings. In the drawings:

FIGS. 4A to 4D show a longitudinal aberration curve, astigmatism curve, distortion curve and lateral color curve of the optical imaging system according to Embodiment 2, respectively;

FIGS. 8A to 8D show a longitudinal aberration curve, astigmatism curve, distortion curve and lateral color curve of the optical imaging system according to Embodiment 4, respectively;

FIG. 9 shows a schematic structural diagram of an optical imaging system according to Embodiment 5 of the present application;

FIGS. 10A to 10D show a longitudinal aberration curve, astigmatism curve, distortion curve and lateral color curve of the optical imaging system according to Embodiment 5, respectively;

FIGS. 24A to 24D show a longitudinal aberration curve, astigmatism curve, distortion curve and lateral color curve of the optical imaging system according to Embodiment 12, respectively.

DETAILED DESCRIPTION

Figure 1:
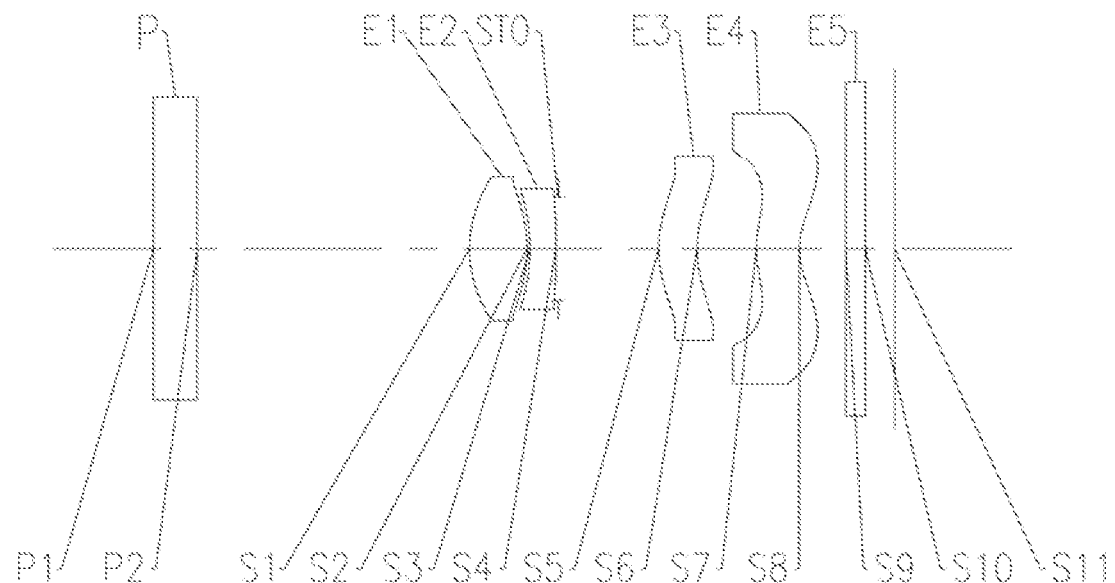
FIG. 1 shows a schematic structural diagram of an optical imaging system according to Embodiment 1 of the present application.

In order to better understand the present application, various aspects of the present application will be described in more detail with reference to the drawings. It should be understood that the detailed description is merely depiction of exemplary embodiments of the present application, and does not limit the scope of the present application in any way. Throughout the description, the same reference numerals refer to the same elements. The expression "and/or" includes any and all combinations of one or more of the associated listed items.

It should be noted that in the present description, the expressions of "first", "second", "third" etc. are only used to distinguish one feature from another feature, and do not indicate any limitation on the feature. Therefore, without departing from the teachings of the present application, a first lens discussed below may also be referred to as a second lens or a third lens.

In the drawings, for convenience of explanation, the thickness, size, and shape of the lens have been slightly exaggerated. Specifically, the shapes of spherical or aspherical surfaces shown in the drawings are shown by way of example. That is, the shapes of the spherical or aspheric surfaces are not limited to those shown in the drawings. The drawings are only examples and are not drawn strictly to scale.

Herein, a paraxial region refers to a region near an optical axis. If a lens surface is convex and the position of the convex surface is not defined, then it means that the lens surface is convex at least in the paraxial region; and if the lens surface is concave and the position of the concave surface is not defined, then it means that the lens surface is concave at least in the paraxial region. A surface of each lens closest to a subject (=an object to be captured) is referred as an object side surface of the lens, and a surface of each lens closest to an imaging plane is referred as an image side surface of the lens.

It should also be understood that the terms "comprising", "comprise", "having", "including" and/or "include" when used in the present description, indicate the existence of stated features, elements and/or components, but does not exclude the presence or addition of one or more other features, elements, components and/or combinations thereof. Furthermore, when an expression such as "at least one of" appears with regard to a list of listed features, it modifies the entire list of listed features, rather than the individual elements in the list. In addition, when describing the implementations of the present application, the use of "may" means "one or more implementations of the present application", and, the term "exemplary" refers to an example or exemplary illustration.

Unless otherwise defined, all terms (including technical and scientific terms) used herein have the same meanings as commonly understood by those ordinarily skilled in the art to which the present application belongs. It should also be understood that the terms (such as those defined in commonly used dictionaries) should be interpreted to have meanings consistent with their meaning in the context of the relevant art and will not be interpreted in an idealized or overly formal sense unless it is clearly defined herein.

It needs to be explained that, in the case of no conflict, the embodiments in the present application and the features in the embodiments can be combined with each other. The present application will be described in detail below in conjunction with embodiments with reference to the drawings.

The features, principles and other aspects of the present application will be described in detail below.

An optical imaging system according to an exemplary implementation of the present application may include a planar glass, and a first lens, a second lens, and a plurality of subsequent lenses having the respective focal powers, arranged in order from an object side to an image side along an optical axis. In an exemplary implementation, the first lens may have a positive focal power, and the second lens may have a negative focal power. In an exemplary implementation, there may be an air spacing between any two adjacent lenses.

In an exemplary implementation, the optical imaging system of the present application may satisfy a conditional expression of $FOV \geq 40°$, where FOV is the maximum field of view of the optical imaging system. More specifically, FOV may further satisfy $40° \leq FOV \leq 60°$, for example, $40.9° \leq FOV \leq 59.0°$. The conditional expression of $FOV \geq 40°$ is satisfied, which is not only advantageous to obtain a wider view range of a subject in the actual capturing process, but also can ensure that the imaging position of the subject can be quickly found in the capturing process, so that consumers have a better sense of use.

In an exemplary implementation, the optical imaging system of the present application may satisfy a conditional expression of $-0.5 < R3/R4 < 0$, where R3 is a radius of curvature of an object side surface of the second lens, and R4 is a radius of curvature of an image side surface of the second lens. More specifically, R3 and R4 may further satisfy $-0.45 \leq R3/R4 \leq -0.002$. The radii of curvature of the object side surface and image side surface of the second lens are reasonably controlled, which, in conjunction with the first lens, can ensure that more light is converged, thereby obtaining a larger aperture and improving the overall image quality. At the same time, the reasonable radii of curvature can avoid the problem of excessive difficulty in actual machining. Optionally, the object side surface of the second lens may be concave, and the image side surface may be concave.

In an exemplary implementation, the optical imaging system of the present application may satisfy a conditional expression of $TL \leq 7.0$ mm, where TL is a distance from the subject to the imaging plane of the optical imaging system on the optical axis. More specifically, TL may further satisfy 6.5 mm $\leq TL \leq 7.0$ mm, for example, 6.68 mm $\leq TL \leq 6.80$ mm. Since the optical imaging system of the present application belongs to a built-in microscopic capturing lens assembly, the distance from the subject to the imaging plane is controlled to be less than 7.0 mm, which can effectively reduce the overall size of the camera lens group, and realize the ultra-thin and small size of the camera lens group, satisfying the requirements of thin and light mobile phones today.

In an exemplary implementation, the optical imaging system of the present application may satisfy a conditional expression of $ImgH/Do \geq 1.0$, where ImgH is the maximum image height of the optical imaging system, and Do is the maximum height of the subject. More specifically, ImgH and Do may further satisfy $1.0 \leq ImgH/Do \leq 1.5$, for example, $1.03 \leq ImgH/Do \leq 1.40$. The ratio of the image height of the subject to the subject height is controlled to be greater than 1, which ensures a sufficiently large magnification to ensure that the local details of the subject can be captured clearly, so that the microstructure of the subject can be studied, achieving the effect of a microscope.

In an exemplary implementation, the optical imaging system of the present application may satisfy a conditional expression of $0.5 < EPD/ImgH < 1.0$, where EPD is an entrance pupil diameter of the optical imaging system, and ImgH is the maximum image height of the optical imaging system. More specifically, EPD and ImgH may further satisfy $0.52 \leq EPD/ImgH \leq 0.81$. The conditional expression of $0.5 < EPD/ImgH < 1.0$ is satisfied, which can not only ensure that the optical imaging system has a large image plane, but also can ensure sufficient light flux when the front-end opening is small. At the same time, it avoids too small EPD, acquisition of too weak light energy, and too low diffraction limit of the optical modulation transfer function (MTF) of the system, thereby avoiding the problem of poor image quality.

In an exemplary implementation, the optical imaging system of the present application may satisfy a conditional expression of $f/EPD < 1.2$, where f is a total effective focal length of the optical imaging system, and EPD is the entrance pupil diameter of the optical imaging system. More specifically, f and EPD may further satisfy $0.5 < f/EPD < 1.2$, for example, $0.75 \leq f/EPD \leq 1.10$. The conditional expression of $f/EPD < 1.2$ is satisfied, and thus the optical system has a larger aperture, ensuring that sufficient imaging light can enter the optical imaging system even when the capturing environment is dark. As a result, the image plane has sufficient brightness, and the good imaging effect can also be achieved when capturing a dark scene.

In an exemplary implementation, the optical imaging system of the present application may satisfy a conditional expression of $f/BFL \geq 1.0$, where f is the total effective focal length of the optical imaging system, and BFL is a distance from an image side surface of a lens closest to an imaging plane of the optical imaging system to the imaging plane on the optical axis. More specifically, f and BFL may further satisfy $1.0 \leq f/BFL \leq 1.5$, for example, $1.01 \leq f/BFL \leq 1.45$. The ratio of the total focal length to the back focal length of the optical imaging system are reasonably controlled. On the one hand, it allows a larger focus range in the debugging process of the module's end. On the other hand, the lens assembly may capture a target (the subject is placed in upper and lower glass cover plates) in actual use, and the sufficiently long back focal length can ensure that the lens assembly finds the best focus point in this case.

In an exemplary implementation, the optical imaging system of the present application may satisfy a conditional expression of $-1.0 \leq R1/R2 \leq -0.5$, where R1 is a radius of curvature of an object side surface of the first lens, and R2 is a radius of curvature of an image side surface of the first lens. More specifically, R1 and R2 may further satisfy $-0.93 \leq R1/R2 \leq -0.53$. The radii of curvature of the object side surface and image side surface of the first lens are reasonably controlled, which can ensure that the light of the first lens has a better convergence ability, slow down the deflection angle of the light, reduce sensitivity, ensure that the lens assembly obtains a larger aperture, and avoid the excessive inclination of the lens surface caused by the steep light, which leads to process problems in the actual machining and molding. Optionally, the object side surface of the first lens may be convex, and the image side surface may be convex.

In an exemplary implementation, the optical imaging system of the present application may satisfy a conditional expression of $0.3 \leq f/f12 < 1.0$, where f is the total effective focal length of the optical imaging system, and f12 is a combined focal length of the first lens and the second lens. More specifically, f and f12 may further satisfy $0.33 \leq f/f12 \leq 0.74$. The combined focal length of the first lens and the second lens is reasonably assigned, which can not only reduce the sensitivity of the two lenses and avoid excessive tolerance requirements, but also can better eliminate the astigmatism, spherical aberration and so on caused by the first lens and the second lens in a complementary manner, thereby improving the overall image quality and obtaining better resolution.

In an exemplary implementation, the optical imaging system of the present application may satisfy a conditional expression of $1.8 \leq To/EPD < 3.0$, where To is a distance from the subject to the object side surface of the first lens on the optical axis, and EPD is the entrance pupil diameter of the optical imaging system. More specifically, To and EPD can further satisfy $1.8 \leq To/EPD \leq 2.73$. The conditional expression of $1.8 \leq To/EPD < 3.0$ is satisfied, which is advantageous to ensure that both the magnification and the field of view of the entire optical imaging system are in reasonable ranges, and to avoid the failure to achieve the microscopic capturing effect due to the too large field of view and small magnification, or avoid the too small field of view due to the large magnification so that only a small local range of the object can be seen clearly in actual use, resulting in poor consumer experience.

In an exemplary implementation, the plurality of subsequent lenses of the optical imaging system of the present application may include a third lens and a fourth lens. In the exemplary implementation, the optical imaging system of the present application may satisfy a conditional expression of $0.3 \leq T34/CT4 < 2.0$, where T34 is a spacing distance between the third lens and the fourth lens on the optical axis, and CT4 is a center thickness of the fourth lens on the optical axis. More specifically, T34 and CT4 may further satisfy $0.38 \leq TC/CT4 \leq 1.61$. The conditional expression of $0.3 \leq T34/CT4 < 2.0$ is satisfied, which can ensure the machining and assembly characteristics, avoid problems such as the interference of the front and rear lens sheets in the assembly process due to the too small gap, or avoid the problems such as difficult molding and easy deformation due to the too thin lens. At the same time, it is also advantageous to reduce light deflection, and can adjust the field curvature of the lens assembly, reduce the sensitivity and thus obtain better imaging quality.

In an exemplary implementation, the plurality of subsequent lenses of the optical imaging system of the present application may include a third lens and a fourth lens. In the exemplary implementation, the optical imaging system of the present application may satisfy a conditional expression of $0 < R5/|R6| < 1.5$, where R5 is a radius of curvature of an object side surface of the third lens, and R6 is a radius of curvature of an image side surface of the third lens. More specifically, R5 and R6 may further satisfy $0.34 \leq R5/|R6| \leq 0.17$. The radii of curvature of the object side surface and image side surface of the third lens are reasonably controlled, which can effectively balance the astigmatism and coma between the third lens and the front lens, so that the lens assembly can maintain better imaging quality. At the same time, it can reduce the sensitivity of the system, and can effectively avoid a series of machining problems caused by poor manufacturability of the third lens. Preferably, R5 and R6 may satisfy $0.85 \leq R5/|R6| < 1.5$. Optionally, in an implementation in which the optical imaging system includes the first lens to the fourth lens, the object side surface of the third lens may be convex.

In an exemplary implementation, the plurality of subsequent lenses of the optical imaging system of the present application may include a third lens and a fourth lens. In the exemplary implementation, the optical imaging system of the present application may satisfy a conditional expression of $-3.0 < f2/R5 < 0$, where f2 is an effective focal length of the second lens, and R5 is the radius of curvature of the object side surface of the third lens. More specifically, f2 and R5 may further satisfy $-2.76 \leq f2/R5 \leq -0.33$. The conditional expression of $-3.0 < f2/R5 < 0$ is satisfied, thus the system's focal power can be reasonably assigned, so that the camera lens group has a higher aberration correction ability while maintaining a small size, and can obtain better manufacturability. Preferably, f2 and R5 may satisfy $-3.0 < f2/R5 < -2.0$.

In an exemplary implementation, the plurality of subsequent lenses of the optical imaging system of the present application may include a third lens, a fourth lens, and a fifth lens. In the exemplary implementation, the optical imaging system of the present application may satisfy a conditional expression of $-1.5 < f4/f5 \leq -1.0$, where f4 is an effective focal length of the fourth lens, and f5 is an effective focal length of the fifth lens. More specifically, f4 and f5 may further satisfy $-1.43 \leq f4/f5 \leq -1.04$. The focal powers of the fourth lens and the fifth lens are reasonably assigned. On the one hand, it can better balance the distortion and astigmatism of the entire system. On the other hand, it is also advantageous to obtain a larger image surface so that the system has higher imaging quality. Optionally, in an implementation in which the optical imaging system includes the first lens to the fifth lens, the fourth lens may have a positive focal power, and the fifth lens may have a negative focal power.

In an exemplary implementation, the plurality of subsequent lenses of the optical imaging system of the present application may include a third lens, a fourth lens, and a fifth lens. In the exemplary implementation, the optical imaging system of the present application can satisfy a conditional expression of $1.0 < f/R7 + f/R8 < 2.5$, where f is the total effective focal length of the optical imaging system, R7 is a radius of curvature of an object side surface of the fourth lens, and R8 is a radius of curvature of an image side surface of the fourth lens. More specifically, f, R7 and R8 may further satisfy $1.41 \leq f/R7 + f/R8 \leq 2.25$. The conditional expression of $1.0 < f/R7 + f/R8 < 2.5$ is satisfied, which can effectively reduce the size of the rear end of the system, and is advantageous for miniaturization of the lens assembly. In addition, it can also effectively control secondary reflection ghost images between the fourth lens and the fifth lens, and prevents excessive ghost images from affecting the actual image quality. Optionally, in an implementation in which the optical imaging system includes the first lens to the fifth lens, the object side surface of the fourth lens may be convex, and the image side surface may be concave.

In an exemplary implementation, the optical imaging system described above may further include at least one diaphragm. The diaphragm can be set at an appropriate position as needed, for example, between the second lens and the third lens. Optionally, the optical imaging lens described above may further include a filter for correcting color deviation and/or a protective glass for protecting a photosensitive element located on the imaging plane.

The optical imaging system according to the above-mentioned implementations of the present application may adopt multiple lens sheets, for example, four or five sheets as described above. The focal power, surface profile and center thickness of each lens, the on-axis distances between the respective lenses, and the like, are reasonably assigned, which can effectively reduce the volume of the imaging lens assembly, reduce the sensitivity of the imaging lens assembly, and improve the machinability of the imaging lens assembly, so that the optical imaging system is more advantageous for production and manufacturing and is applicable for portable electronic products. The present application proposes an optical imaging system that can be used with a built-in microscopic capturing lens assembly. The imaging system has the characteristics of microscopic capturing, large field of view, large aperture, high imaging quality, miniaturization and so on, and can match higher-pixel sensors and stronger image processing technology.

In the implementations of the present application, at least one of the lens surfaces of each lens is an aspheric lens surface, that is, at least one of an object side surface and an image side surface of each lens among the first lens, the second lens, and the plurality of subsequent lenses (for example, the third lens and the fourth lens, or the third lens, the fourth lens and the fifth lens) is an aspheric lens surface. An aspheric lens is characterized in that the curvature changes continuously from the center of the lens to the periphery of the lens. Unlike a spherical lens having a constant curvature from the center of the lens to the periphery of the lens, the aspheric lens has better radius-of-curvature properties, and has the advantages of improving distortion aberration and improving astigmatism aberration. After the aspheric lens is adopted, the aberrations that occur during imaging can be eliminated as much as possible, thereby improving the imaging quality. Optionally, both an object side surface and an image side surface of each lens among the first lens, the second lens, and the plurality of subsequent lenses (for example, the third lens and the fourth lens, or the third lens, the fourth lens and the fifth lens) are aspheric lens surfaces.

However, it should be understood by those skilled in the art that the number of lenses constituting the optical imaging system can be changed without departing from the technical solution claimed in the present application, to obtain respective results and advantages described in the description. For example, although four or five lenses have been described in the implementations as an example, the optical imaging system is not limited to including the four or five lenses. If necessary, the optical imaging system may also include other numbers of lenses.

Specific embodiments of the optical imaging system applicable to the above-mentioned implementations will be further described below with reference to the drawings.

Embodiment 1

An optical imaging system according to Embodiment 1 of the present application will be described below with reference to FIGS. 1 to 2D. FIG. 1 shows a schematic structural diagram of the optical imaging system according to Embodiment 1 of the present application.

As shown in FIG. 1, the optical imaging system includes, in order from an object side to an image side along an optical axis: a planar glass P, a first lens E1, a second lens E2, a diaphragm STO, a third lens E3, a fourth lens E4, a filter E5 and an imaging plane S11.

The first lens E1 has a positive focal power, and has a convex object side surface S1 and a convex image side surface S2. The second lens E2 has a negative focal power, and has a concave object side surface S3 and a concave image side surface S4. The third lens E3 has a positive focal power, and has a convex object side surface S5 and a concave image side surface S6. The fourth lens E4 has a negative focal power, and has a convex object side surface S7 and a concave image side surface S8. The filter E5 has an object side surface S9 and an image side surface S10. Light from an object sequentially passes through the respective surfaces S1 to S10 and finally forms an image on the imaging plane S11.

Table 1 shows a table of basic parameters of the optical imaging system of Embodiment 1, wherein the units of the radius of curvature, thickness, and focal length are all millimeters (mm).

TABLE 1

Embodiment 1: f = 1.11 mm, TL = 6.80 mm, FOV = 43.3°

| Surface No. | Surface type | Radius of curvature | Thickness | Refractive index | Dispersion coefficient | Focal length | Conic coefficient |
|---|---|---|---|---|---|---|---|
| OBJ | Spherical | Infinity | 0.0500 | | | | |
| P1 | Spherical | Infinity | 0.4000 | 1.517 | 64.20 | | |
| P2 | Spherical | Infinity | 2.4804 | | | | |
| S1 | Aspherical | 1.1182 | 0.5249 | 1.546 | 56.11 | 1.16 | −3.5312 |
| S2 | Aspherical | −1.2068 | 0.0250 | | | | −5.2472 |
| S3 | Aspherical | −2.0109 | 0.2350 | 1.678 | 19.25 | −2.86 | 7.4729 |
| S4 | Aspherical | 53.2911 | 0.0207 | | | | 55.6836 |
| STO | Spherical | Infinity | 0.9166 | | | | |
| S5 | Aspherical | 1.0359 | 0.3500 | 1.666 | 20.40 | 16.08 | −11.4215 |
| S6 | Aspherical | 0.9918 | 0.5394 | | | | −8.5881 |
| S7 | Aspherical | 0.9253 | 0.3911 | 1.546 | 56.11 | −5.19 | −6.0899 |
| S8 | Aspherical | 0.5933 | 0.4257 | | | | −1.0176 |
| S9 | Spherical | Infinity | 0.1758 | 1.517 | 64.20 | | |
| S10 | Spherical | Infinity | 0.2655 | | | | |
| S11 | Spherical | Infinity | | | | | | f is a total effective focal length of the optical imaging system, TL is a distance from a subject to the imaging plane S11 of the optical imaging system on the optical axis, and FOV is the maximum field of view of the optical imaging system.

In Embodiment 1, both the object side surface and image side surface of any one of the first lens E1 to the fourth lens E4 are aspherical, and the surface profile x of each aspherical lens can be defined by using but not limited to the following aspherical formula:

$$x = \frac{ch^2}{1+\sqrt{1-(k+1)c^2h^2}} + \sum A_i h^i \quad (1)$$

where x is a distance vector height from a vertex of the aspheric surface when the aspheric surface is at a height of h along the optical axis direction; c is paraxial curvature of the aspheric surface, c=1/R (that is, the paraxial curvature c is the reciprocal of the radius of curvature R in Table 1 above); k is a conic coefficient; and Ai is a correction coefficient of an i-th order of the aspheric surface. Higher-order coefficients $A_4, A_6, A_8, A_{10}, A_{12}, A_{14}, A_{16}, A_{18}$ and $A_{20}$ of each aspheric lens surface of S1 to S8 that are applicable in Embodiment 1 are given in Table 2 below.

Figures 2A, 2B:
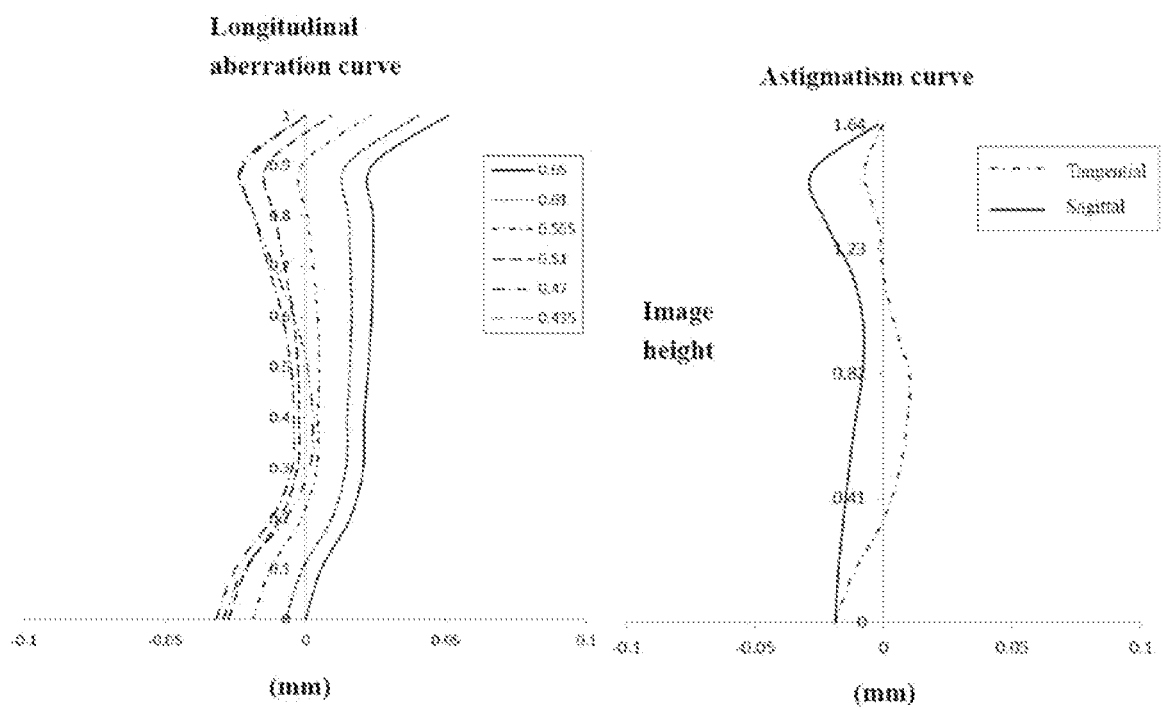
FIGS. 2A to 2D show a longitudinal aberration curve, astigmatism curve, distortion curve and lateral color curve of the optical imaging system according to Embodiment 1, respectively.
Figures 2C, 2D:
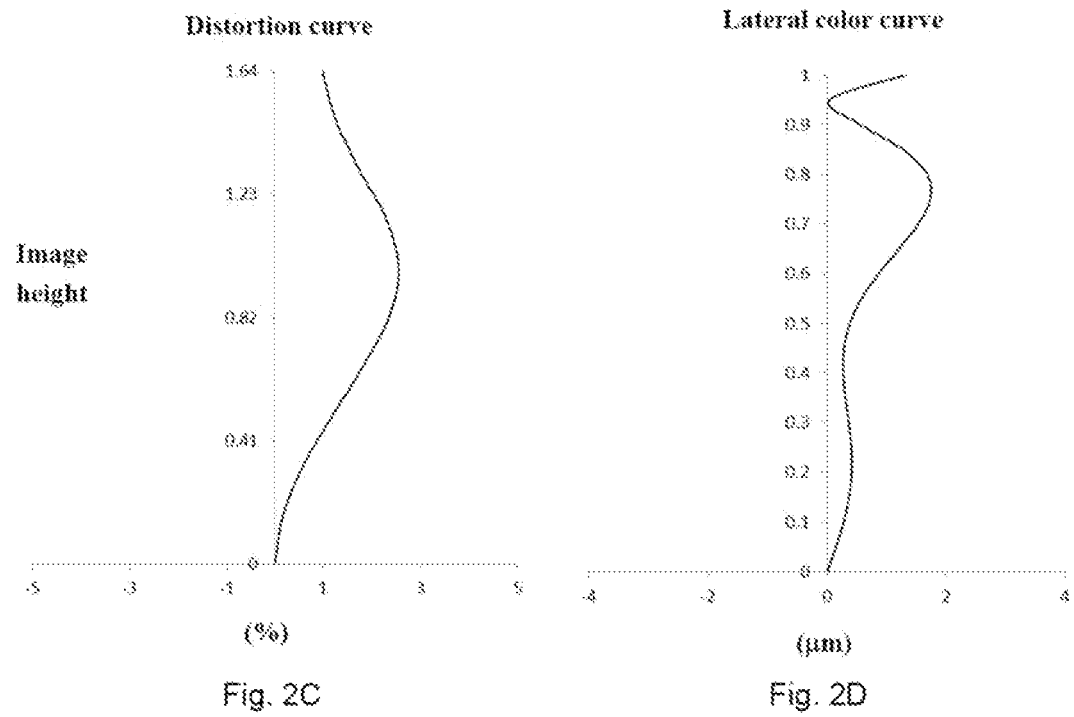

FIG. 2A shows a longitudinal aberration curve of the optical imaging system according to Embodiment 1, which represents the deviation of the converged focal point after light of different wavelengths passes through the lens assembly. FIG. 2B shows an astigmatism curve of the optical imaging system according to Embodiment 1, which represents the curvature of the tangential image plane and the curvature of the sagittal image plane. FIG. 2C shows a distortion curve of the optical imaging system according to Embodiment 1, which represents distortion magnitude values corresponding to different image heights. FIG. 2D shows a lateral color curve of the optical imaging system according to Embodiment 1, which represents the deviation of different image heights on the imaging plane after light passes through the lens assembly. According to FIGS. 2A to 2D, it can be seen that the optical imaging system given in Embodiment 1 can realize good imaging quality.

Embodiment 2

Figure 3:
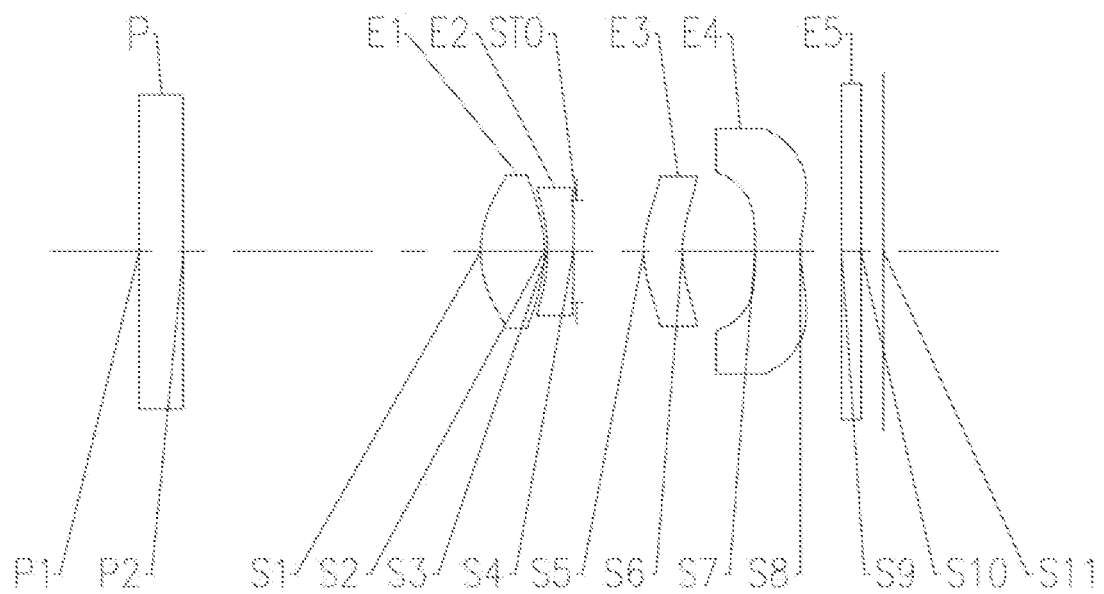
FIG. 3 shows a schematic structural diagram of an optical imaging system according to Embodiment 2 of the present application.

An optical imaging system according to Embodiment 2 of the present application will be described below with reference to FIGS. 3 to 4D. In this embodiment and the following embodiments, for the sake of brevity, the description of parts similar to those in Embodiment 1 will be omitted. FIG. 3 shows a schematic structural diagram of the optical imaging system according to Embodiment 2 of the present application.

As shown in FIG. 3, the optical imaging system includes, in order from an object side to an image side along an optical axis: a planar glass P, a first lens E1, a second lens E2, a diaphragm STO, a third lens E3, a fourth lens E4, a filter E5 and an imaging plane S11.

The first lens E1 has a positive focal power, and has a convex object side surface S1 and a convex image side surface S2. The second lens E2 has a negative focal power, and has a concave object side surface S3 and a concave image side surface S4. The third lens E3 has a positive focal power, and has a convex object side surface S5 and a concave image side surface S6. The fourth lens E4 has a negative focal power, and has a concave object side surface S7 and a concave image side surface S8. The filter E5 has an object side surface S9 and an image side surface S10. Light from an object sequentially passes through the respective surfaces S1 to S10 and finally forms an image on the imaging plane S11.

Table 3 shows a table of basic parameters of the optical imaging system of Embodiment 2, wherein the units of the radius of curvature, thickness, and focal length are all millimeters (mm). Table 4 shows higher-order coefficients of each aspheric lens surface that are applicable in Embodiment 2, wherein the surface profile of each aspheric surface can be defined by formula (1) given in Embodiment 1 described above.

TABLE 2

| Surface No. | A4 | A6 | A8 | A10 | A12 |
|---|---|---|---|---|---|
| S1 | 3.9299E−02 | −2.8439E−03 | −8.1782E−04 | −3.6974E−04 | −1.6335E−04 |
| S2 | −4.2815E−03 | 2.8776E−03 | −2.4018E−03 | 6.3924E−04 | −3.0969E−04 |
| S3 | −9.8406E−05 | 7.8520E−03 | −1.5777E−03 | 6.1078E−04 | −1.6797E−04 |
| S4 | −1.8934E−02 | 2.6360E−03 | −2.8173E−04 | 5.7835E−05 | 1.4426E−06 |
| S5 | 1.9655E−02 | −2.5983E−02 | 1.1812E−03 | −1.1164E−03 | 9.6174E−05 |
| S6 | −4.3281E−02 | −2.5910E−02 | −6.2050E−04 | 5.4074E−05 | −1.6085E−04 |
| S7 | −4.5459E−01 | 5.0386E−05 | −1.0360E−02 | −2.9823E−03 | 1.2056E−04 |
| S8 | −1.5025E+00 | 1.8560E−01 | −5.4628E−02 | 1.6310E−02 | −4.1850E−03 |

| Surface No. | A14 | A16 | A18 | A20 |
|---|---|---|---|---|
| S1 | −5.0163E−05 | −1.7807E−05 | 4.4639E−06 | 9.9785E−08 |
| S2 | 1.2110E−04 | −2.6352E−05 | 1.3999E−05 | −7.5133E−06 |
| S3 | 7.3609E−06 | −8.5873E−06 | 7.6066E−06 | −3.8043E−06 |
| S4 | 5.4328E−06 | 7.1168E−06 | 2.3856E−06 | 2.6973E−06 |
| S5 | −1.1163E−04 | 1.6162E−06 | −1.3728E−05 | 4.4970E−06 |
| S6 | 4.0454E−05 | −2.8048E−05 | 1.1786E−05 | 2.4521E−06 |
| S7 | 1.2453E−04 | 3.0253E−04 | 1.1607E−04 | 2.7421E−05 |
| S8 | 1.8526E−03 | −2.8718E−04 | 1.5224E−04 | −4.4381E−05 |

TABLE 3

Embodiment 2: f = 1.09 mm, TL = 6.78 mm, FOV = 40.9°

| Surface No. | Surface type | Radius of curvature | Thickness | Material Refractive index | Dispersion coefficient | Focal length | Conic coefficient |
|---|---|---|---|---|---|---|---|
| OBJ | Spherical | Infinity | 0.0500 | | | | |
| P1 | Spherical | Infinity | 0.4000 | 1.517 | 64.20 | | |
| P2 | Spherical | Infinity | 2.6890 | | | | |
| S1 | Aspherical | 1.0046 | 0.5789 | 1.546 | 56.11 | 1.10 | −3.1825 |
| S2 | Aspherical | −1.1950 | 0.0250 | | | | −5.4816 |
| S3 | Aspherical | −1.9709 | 0.2350 | 1.678 | 19.25 | −2.26 | 7.4726 |
| S4 | Aspherical | 7.2116 | 0.0268 | | | | −50.6438 |
| STO | Spherical | Infinity | 0.6104 | | | | |
| S5 | Aspherical | 0.9627 | 0.3500 | 1.666 | 20.40 | 6.14 | −12.5515 |
| S6 | Aspherical | 1.0757 | 0.6567 | | | | −7.9101 |
| S7 | Aspherical | −100.0000 | 0.4086 | 1.546 | 56.11 | −2.29 | 99.9900 |
| S8 | Aspherical | 1.2677 | 0.3670 | | | | −0.7843 |
| S9 | Spherical | Infinity | 0.1758 | 1.517 | 64.20 | | |
| S10 | Spherical | Infinity | 0.2068 | | | | |
| S11 | Spherical | Infinity | | | | | |

TABLE 4

| Surface No. | A4 | A6 | A8 | A10 | A12 |
|---|---|---|---|---|---|
| S1 | 4.8957E−02 | −1.0534E−02 | −3.3634E−03 | −1.1278E−03 | −2.0322E−04 |
| S2 | −5.2581E−03 | 5.3180E−04 | −3.8544E−03 | 1.5602E−03 | −5.2146E−04 |
| S3 | 4.0250E−03 | 1.3878E−02 | −2.4683E−03 | 1.3898E−03 | −3.3932E−04 |
| S4 | −2.8090E−02 | 4.7494E−03 | −5.6623E−04 | 1.3176E−04 | −1.8360E−05 |
| S5 | 2.8027E−02 | −1.5561E−02 | 2.6993E−03 | −7.6012E−04 | 1.8386E−04 |
| S6 | −9.5653E−03 | −9.7433E−03 | 5.9579E−04 | −2.1749E−04 | −4.8320E−05 |
| S7 | −3.2657E−01 | −1.6908E−02 | −1.1601E−02 | −4.0555E−03 | −1.7132E−03 |
| S8 | −8.6561E−01 | 4.4878E−02 | −2.4844E−02 | 1.4128E−03 | −1.6155E−03 |

| Surface No. | A14 | A16 | A18 | A20 |
|---|---|---|---|---|
| S1 | 5.0100E−05 | 7.6473E−05 | 5.0653E−05 | 1.4820E−05 |
| S2 | 3.1108E−04 | −1.0050E−04 | 3.1972E−05 | −1.8704E−05 |
| S3 | 1.7060E−04 | −4.7486E−05 | 5.1136E−06 | −1.0279E−05 |
| S4 | 4.9593E−06 | 3.0840E−06 | −2.6008E−06 | −1.5473E−06 |
| S5 | −1.0721E−04 | −1.1971E−05 | −2.7901E−05 | −7.0298E−06 |
| S6 | −5.1348E−05 | −4.4171E−05 | −2.9746E−05 | −1.6794E−05 |
| S7 | −7.7965E−04 | −3.5844E−04 | −1.4814E−04 | −6.7778E−05 |
| S8 | −2.1536E−04 | 1.7333E−06 | −6.6660E−05 | 8.5748E−05 |

FIG. 4A shows a longitudinal aberration curve of the optical imaging system according to Embodiment 2, which represents the deviation of the converged focal point after light of different wavelengths passes through the lens assembly. FIG. 4B shows an astigmatism curve of the optical imaging system according to Embodiment 2, which represents the curvature of the tangential image plane and the curvature of the sagittal image plane. FIG. 4C shows a distortion curve of the optical imaging system according to Embodiment 2, which represents distortion magnitude values corresponding to different image heights. FIG. 4D shows a lateral color curve of the optical imaging system according to Embodiment 2, which represents the deviation of different image heights on the imaging plane after light passes through the lens assembly. According to FIGS. 4A to 4D, it can be seen that the optical imaging system given in Embodiment 2 can realize good imaging quality.

Embodiment 3

Figure 5:
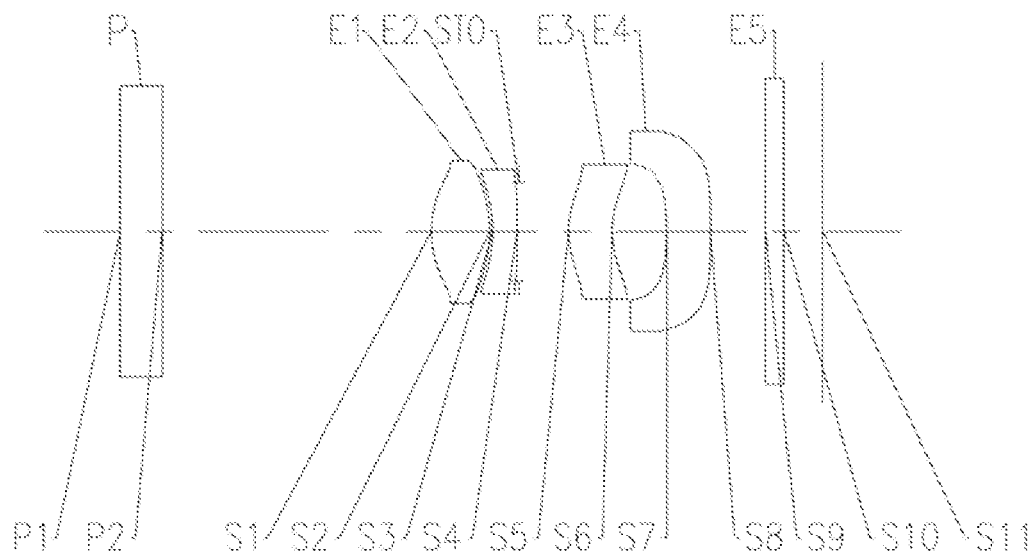
FIG. 5 shows a schematic structural diagram of an optical imaging system according to Embodiment 3 of the present application.

An optical imaging system according to Embodiment 3 of the present application will be described below with reference to FIGS. 5 to 6D. FIG. 5 shows a schematic structural diagram of the optical imaging system according to Embodiment 3 of the present application.

As shown in FIG. 5, the optical imaging system includes, in order from an object side to an image side along an optical axis: a planar glass P, a first lens E1, a second lens E2, a diaphragm STO, a third lens E3, a fourth lens E4, a filter E5 and an imaging plane S11.

The first lens E1 has a positive focal power, and has a convex object side surface S1 and a convex image side surface S2. The second lens E2 has a negative focal power, and has a concave object side surface S3 and a concave image side surface S4. The third lens E3 has a positive focal power, and has a convex object side surface S5 and a concave image side surface S6. The fourth lens E4 has a negative focal power, and has a concave object side surface S7 and a convex image side surface S8. The filter E5 has an object side surface S9 and an image side surface S10. Light from an object sequentially passes through the respective surfaces S1 to S10 and finally forms an image on the imaging plane S11.

Table 5 shows a table of basic parameters of the optical imaging system of Embodiment 3, wherein the units of the radius of curvature, thickness, and focal length are all millimeters (mm). Table 6 shows higher-order coefficients of each aspheric lens surface that are applicable in Embodiment 3, wherein the surface profile of each aspheric surface can be defined by formula (1) given in Embodiment 1 described above.

TABLE 5

Embodiment 3: f = 1.32 mm, TL = 6.77 mm, FOV = 41.5°

| Surface No. | Surface type | Radius of curvature | Thickness | Material Refractive index | Dispersion coefficient | Focal length | Conic coefficient |
|---|---|---|---|---|---|---|---|
| OBJ | Spherical | Infinity | 0.0500 | | | | |
| P1 | Spherical | Infinity | 0.4000 | 1.517 | 64.20 | | |
| P2 | Spherical | Infinity | 2.5782 | | | | |
| S1 | Aspherical | 0.9860 | 0.5606 | 1.546 | 56.11 | 1.08 | −4.1518 |
| S2 | Aspherical | −1.1725 | 0.0250 | | | | −4.5222 |
| S3 | Aspherical | −1.8419 | 0.2350 | 1.678 | 19.25 | −1.90 | 7.4997 |
| S4 | Aspherical | 4.5142 | 0.0166 | | | | −99.0000 |
| STO | Spherical | Infinity | 0.4757 | | | | |
| S5 | Aspherical | 0.7922 | 0.4175 | 1.666 | 20.40 | 5.05 | −12.3571 |
| S6 | Aspherical | 0.8176 | 0.5215 | | | | −5.6362 |
| S7 | Aspherical | −3.2257 | 0.4200 | 1.546 | 56.11 | −6.34 | 23.2202 |
| S8 | Aspherical | −50.0000 | 0.5272 | | | | 69.6977 |
| S9 | Spherical | Infinity | 0.1758 | 1.517 | 64.20 | | |
| S10 | Spherical | Infinity | 0.3669 | | | | |
| S11 | Spherical | Infinity | | | | | |

TABLE 6

| Surface No. | A4 | A6 | A8 | A10 | A12 |
|---|---|---|---|---|---|
| S1 | 3.0604E−02 | −2.4183E−02 | −6.3184E−03 | −1.3626E−03 | 2.7181E−04 |
| S2 | −1.8253E−02 | −4.9249E−03 | −4.6604E−03 | 3.0070E−03 | −1.0591E−03 |
| S3 | 7.3123E−03 | 2.2824E−02 | −2.9389E−03 | 2.9828E−03 | −5.7869E−04 |
| S4 | −4.7679E−02 | 8.1492E−03 | −1.2818E−03 | 3.3395E−04 | −7.7003E−05 |
| S5 | 2.2654E−02 | −1.8022E−02 | 4.1964E−03 | −1.0474E−03 | 3.5321E−04 |
| S6 | −1.3510E−02 | −1.1482E−02 | 1.8374E−03 | −3.7880E−04 | 2.8211E−05 |
| S7 | −1.5484E−01 | −3.3691E−02 | −1.5753E−02 | −8.2730E−03 | −4.0865E−03 |
| S8 | −3.7260E−01 | −5.4990E−02 | −1.9688E−02 | −1.0697E−02 | −3.4442E−03 |

| Surface No. | A14 | A16 | A18 | A20 |
|---|---|---|---|---|
| S1 | 3.9633E−04 | 2.2789E−04 | 9.0819E−05 | 1.7495E−05 |
| S2 | 5.2759E−04 | −1.7636E−04 | 1.0723E−04 | −1.3686E−05 |
| S3 | 3.8711E−04 | −7.0683E−05 | 3.8743E−05 | 7.6358E−06 |
| S4 | 1.6832E−05 | 4.8409E−07 | −3.6891E−06 | 3.0691E−07 |
| S5 | −1.4440E−04 | 4.7797E−05 | −4.5632E−06 | 1.2419E−05 |
| S6 | −7.0963E−05 | −4.2550E−05 | −2.7523E−05 | −1.5572E−05 |
| S7 | −1.9921E−03 | −9.1654E−04 | −3.3871E−04 | −1.2638E−04 |
| S8 | −2.1086E−03 | −5.2745E−04 | −3.0424E−04 | −1.2754E−05 |

Figure 6A:
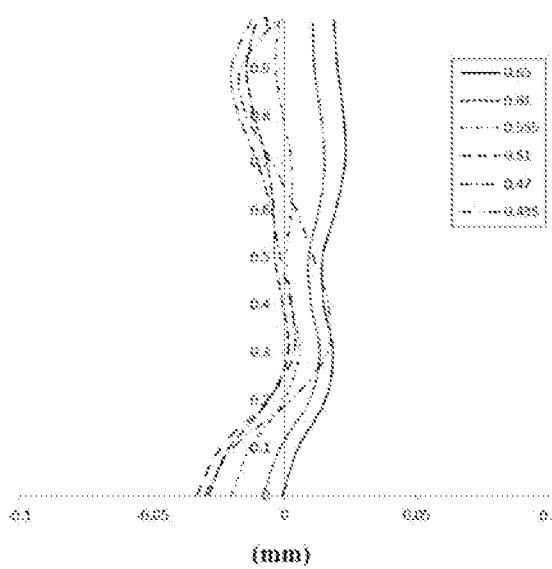
FIGS. 6A to 6D show a longitudinal aberration curve, astigmatism curve, distortion curve and lateral color curve of the optical imaging system according to Embodiment 3, respectively.
Figure 6B:
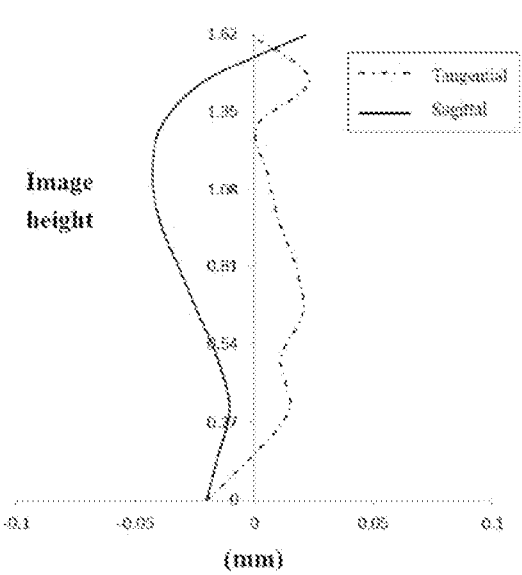
Figures 6C, 6D:
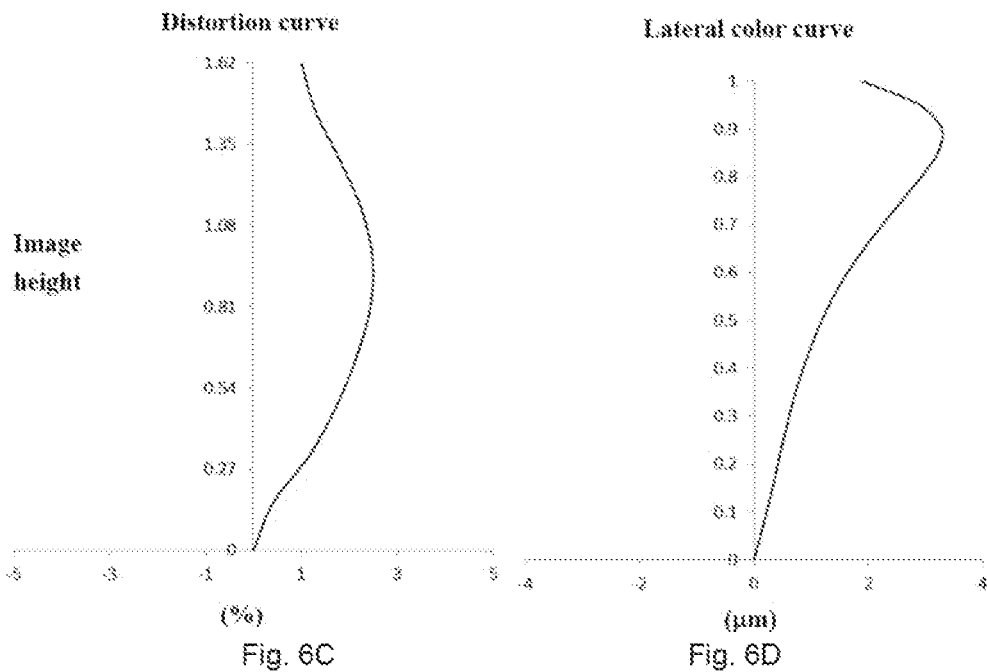

FIG. 6A shows a longitudinal aberration curve of the optical imaging system according to Embodiment 3, which represents the deviation of the converged focal point after light of different wavelengths passes through the lens assembly. FIG. 6B shows an astigmatism curve of the optical imaging system according to Embodiment 3, which represents the curvature of the tangential image plane and the curvature of the sagittal image plane. FIG. 6C shows a distortion curve of the optical imaging system according to Embodiment 3, which represents distortion magnitude values corresponding to different image heights. FIG. 6D shows a lateral color curve of the optical imaging system according to Embodiment 3, which represents the deviation of different image heights on the imaging plane after light passes through the lens assembly. According to FIGS. 6A to 6D, it can be seen that the optical imaging system given in Embodiment 3 can realize good imaging quality.

Embodiment 4

Figure 7:
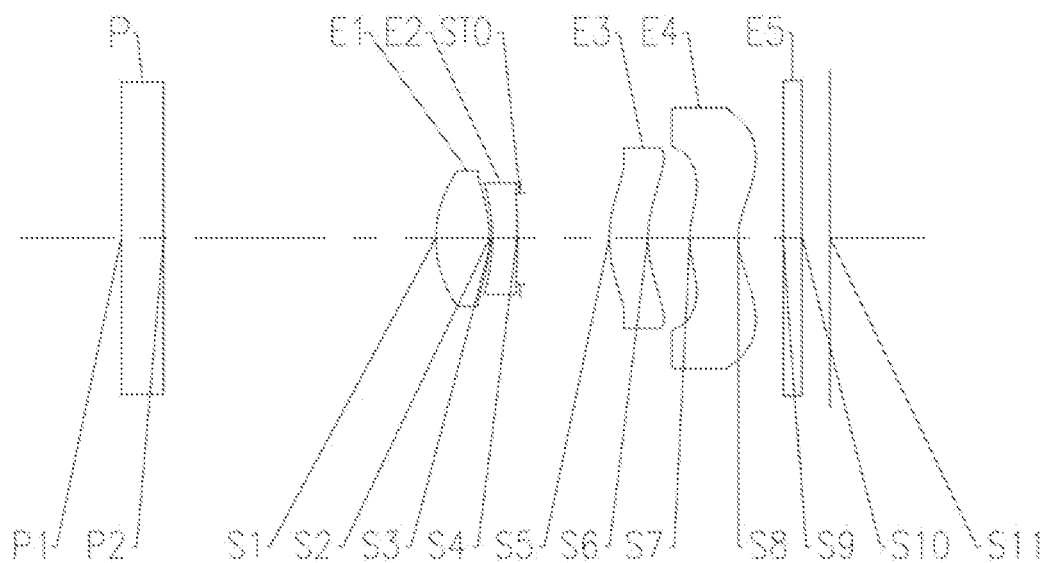
FIG. 7 shows a schematic structural diagram of an optical imaging system according to Embodiment 4 of the present application.

An optical imaging system according to Embodiment 4 of the present application will be described below with reference to FIGS. 7 to 8D. FIG. 7 shows a schematic structural diagram of the optical imaging system according to Embodiment 4 of the present application.

As shown in FIG. 7, the optical imaging system includes, in order from an object side to an image side along an optical axis: a planar glass P, a first lens E1, a second lens E2, a diaphragm STO, a third lens E3, a fourth lens E4, a filter E5 and an imaging plane S11.

The first lens E1 has a positive focal power, and has a convex object side surface S1 and a convex image side surface S2. The second lens E2 has a negative focal power, and has a concave object side surface S3 and a concave image side surface S4. The third lens E3 has a negative focal power, and has a convex object side surface S5 and a concave image side surface S6. The fourth lens E4 has a negative focal power, and has a convex object side surface S7 and a concave image side surface S8. The filter E5 has an object side surface S9 and an image side surface S10. Light from an object sequentially passes through the respective surfaces S1 to S10 and finally forms an image on the imaging plane S11.

Table 7 shows a table of basic parameters of the optical imaging system of Embodiment 4, wherein the units of the radius of curvature, thickness, and focal length are all millimeters (mm). Table 8 shows higher-order coefficients of each aspheric lens surface that are applicable in Embodiment 4, wherein the surface profile of each aspheric surface can be defined by formula (1) given in Embodiment 1 described above.

TABLE 7

Embodiment 4: f = 1.15 mm, TL = 6.75 mm, FOV = 44.9°

| Surface No. | Surface type | Radius of curvature | Thickness | Material Refractive index | Material Dispersion coefficient | Focal length | Conic coefficient |
|---|---|---|---|---|---|---|---|
| OBJ | Spherical | Infinity | 0.0500 | | | | |
| P1 | Spherical | Infinity | 0.4000 | 1.517 | 64.20 | | |
| P2 | Spherical | Infinity | 2.5743 | | | | |
| S1 | Aspherical | 1.0838 | 0.5082 | 1.546 | 56.11 | 1.15 | −3.3221 |
| S2 | Aspherical | −1.2324 | 0.0250 | | | | −6.7630 |
| S3 | Aspherical | −1.9967 | 0.2350 | 1.678 | 19.25 | −2.84 | 5.6393 |
| S4 | Aspherical | 53.5188 | 0.0260 | | | | 99.9900 |
| STO | Spherical | Infinity | 0.8460 | | | | |
| S5 | Aspherical | 1.1000 | 0.3650 | 1.666 | 20.40 | −100.00 | −12.6187 |
| S6 | Aspherical | 0.9385 | 0.3973 | | | | −11.9437 |
| S7 | Aspherical | 0.8345 | 0.4561 | 1.546 | 56.11 | −15.46 | −9.6891 |
| S8 | Aspherical | 0.6129 | 0.4258 | | | | −1.0400 |
| S9 | Spherical | Infinity | 0.1758 | 1.517 | 64.20 | | |
| S10 | Spherical | Infinity | 0.2656 | | | | |
| S11 | Spherical | Infinity | | | | | |

TABLE 8

| Surface No. | A4 | A6 | A8 | A10 | A12 |
|---|---|---|---|---|---|
| S1 | 4.0112E−02 | −2.0476E−03 | −8.0894E−04 | −4.1079E−04 | −1.9858E−04 |
| S2 | 4.3955E−04 | 4.4041E−04 | −1.3260E−03 | 1.9378E−04 | −1.2366E−04 |
| S3 | 3.0246E−03 | 3.0816E−03 | −7.3581E−04 | 2.1572E−04 | −5.6267E−05 |
| S4 | −1.2278E−02 | 1.4474E−03 | −1.2083E−04 | 2.0845E−05 | 4.6430E−06 |
| S5 | 1.5995E−02 | −2.0474E−02 | 4.6399E−04 | −6.5811E−04 | −1.4737E−06 |
| S6 | −2.1332E−02 | −2.8260E−02 | −1.0097E−03 | −3.0534E−04 | −1.3311E−04 |
| S7 | −3.5343E−01 | −1.9354E−02 | −7.9167E−03 | −6.1541E−03 | 1.6491E−04 |
| S8 | −1.4456E+00 | 1.6909E−01 | −5.6940E−02 | 1.5935E−02 | −4.3235E−03 |

| Surface No. | A14 | A16 | A18 | A20 |
|---|---|---|---|---|
| S1 | −5.6165E−05 | −1.8866E−05 | 5.1409E−06 | −7.6854E−07 |
| S2 | 5.2175E−05 | −6.3378E−06 | −1.0907E−07 | −4.5662E−06 |
| S3 | 2.5477E−05 | −2.0517E−06 | 1.0144E−06 | −2.4437E−06 |
| S4 | 2.4632E−06 | 3.7481E−06 | −1.0631E−06 | −3.2628E−07 |
| S5 | −4.5515E−05 | −1.7236E−05 | −9.6526E−06 | −1.7857E−07 |
| S6 | 1.0161E−05 | −2.6996E−05 | 7.3397E−07 | 4.6423E−06 |
| S7 | −3.8908E−04 | 4.2889E−04 | 9.9806E−05 | 9.2861E−05 |
| S8 | 2.1381E−03 | −2.6675E−04 | 2.7739E−04 | −3.8012E−05 |

FIG. 8A shows a longitudinal aberration curve of the optical imaging system according to Embodiment 4, which represents the deviation of the converged focal point after light of different wavelengths passes through the lens assembly. FIG. 8B shows an astigmatism curve of the optical imaging system according to Embodiment 4, which represents the curvature of the tangential image plane and the curvature of the sagittal image plane. FIG. 8C shows a distortion curve of the optical imaging system according to Embodiment 4, which represents distortion magnitude values corresponding to different image heights. FIG. 8D shows a lateral color curve of the optical imaging system according to Embodiment 4, which represents the deviation of different image heights on the imaging plane after light passes through the lens assembly. According to FIGS. 8A to 8D, it can be seen that the optical imaging system given in Embodiment 4 can realize good imaging quality.

Embodiment 5

An optical imaging system according to Embodiment 5 of the present application will be described below with reference to FIGS. 9 to 10D. FIG. 9 shows a schematic structural diagram of the optical imaging system according to Embodiment 5 of the present application.

As shown in FIG. 9, the optical imaging system includes, in order from an object side to an image side along an optical axis: a planar glass P, a first lens E1, a second lens E2, a diaphragm STO, a third lens E3, a fourth lens E4, a filter E5 and an imaging plane S11.

The first lens E1 has a positive focal power, and has a convex object side surface S1 and a convex image side surface S2. The second lens E2 has a negative focal power, and has a concave object side surface S3 and a concave image side surface S4. The third lens E3 has a positive focal power, and has a convex object side surface S5 and a concave image side surface S6. The fourth lens E4 has a positive focal power, and has a convex object side surface S7 and a concave image side surface S8. The filter E5 has an object side surface S9 and an image side surface S10. Light from an object sequentially passes through the respective surfaces S1 to S10 and finally forms an image on the imaging plane S11.

Table 9 shows a table of basic parameters of the optical imaging system of Embodiment 5, wherein the units of the radius of curvature, thickness, and focal length are all millimeters (mm). Table 10 shows higher-order coefficients of each aspheric lens surface that are applicable in Embodiment 5, wherein the surface profile of each aspheric surface can be defined by formula (1) given in Embodiment 1 described above.

TABLE 9

Embodiment 5: f = 1.19 mm, TL = 6.70 mm, FOV = 47.2°

| Surface No. | Surface type | Radius of curvature | Thickness | Material Refractive index | Dispersion coefficient | Focal length | Conic coefficient |
|---|---|---|---|---|---|---|---|
| OBJ | Spherical | Infinity | 0.0500 | | | | |
| P1 | Spherical | Infinity | 0.4000 | 1.517 | 64.20 | | |
| P2 | Spherical | Infinity | 2.4500 | | | | |
| S1 | Aspherical | 1.0977 | 0.5011 | 1.546 | 56.11 | 1.13 | −3.3980 |
| S2 | Aspherical | −1.1915 | 0.0250 | | | | −7.9513 |
| S3 | Aspherical | −2.0519 | 0.2350 | 1.678 | 19.25 | −2.59 | 5.1310 |
| S4 | Aspherical | 12.5409 | 0.0307 | | | | −93.5301 |
| STO | Spherical | Infinity | 0.8065 | | | | |
| S5 | Aspherical | 1.0980 | 0.3750 | 1.666 | 20.40 | 44.50 | −12.9746 |
| S6 | Aspherical | 0.9845 | 0.4621 | | | | −13.0259 |
| S7 | Aspherical | 0.7150 | 0.4321 | 1.546 | 56.11 | 61.75 | −6.0110 |
| S8 | Aspherical | 0.5746 | 0.4413 | | | | −1.0705 |
| S9 | Spherical | Infinity | 0.2100 | 1.517 | 64.20 | | |
| S10 | Spherical | Infinity | 0.2811 | | | | |
| S11 | Spherical | Infinity | | | | | |

TABLE 10

| Surface No. | A4 | A6 | A8 | A10 | A12 |
|---|---|---|---|---|---|
| S1 | 2.3785E−01 | 9.1685E−01 | −1.2767E+01 | 9.1569E+01 | −3.7660E+02 |
| S2 | −2.1707E−01 | 4.6988E+00 | −4.6299E+01 | 3.5325E+02 | −2.1305E+03 |
| S3 | −3.2512E−01 | 7.3026E+00 | −1.0108E+02 | 1.2014E+03 | −1.0366E+04 |
| S4 | −5.7452E−01 | 1.6342E+00 | −1.3847E+01 | 7.1651E+02 | −1.4565E+04 |
| S5 | 5.4369E−01 | −2.3985E+00 | 8.6322E+00 | −3.4254E+01 | 1.0997E+02 |
| S6 | 2.8889E−01 | −1.0913E+00 | 3.8471E+00 | −1.5953E+01 | 4.4579E+01 |
| S7 | 2.6865E−01 | −4.7670E+00 | 1.9732E+01 | −5.5880E+01 | 1.1320E+02 |
| S8 | −1.4941E+00 | 2.1783E+00 | −2.7098E+00 | 2.5735E+00 | −1.7925E+00 |

| Surface No. | A14 | A16 | A18 | A20 |
|---|---|---|---|---|
| S1 | 8.5971E+02 | −9.0183E+02 | 6.3155E+01 | 3.5877E+02 |
| S2 | 9.2500E+03 | −2.5959E+04 | 4.0997E+04 | −2.7384E+04 |
| S3 | 5.8857E+04 | −2.0559E+05 | 3.9790E+05 | −3.2528E+05 |
| S4 | 1.4816E+05 | −8.2085E+05 | 2.3689E+06 | −2.7891E+06 |
| S5 | −2.5377E+02 | 3.7712E+02 | −3.1934E+02 | 1.1502E+02 |
| S6 | −8.0707E+01 | 9.0686E+01 | −5.7457E+01 | 1.5670E+01 |
| S7 | −1.5912E+02 | 1.4551E+02 | −7.7239E+01 | 1.7915E+01 |
| S8 | 8.3490E−01 | −2.1710E−01 | 1.4958E−02 | 3.6518E−03 |

Figures 10C, 10D:
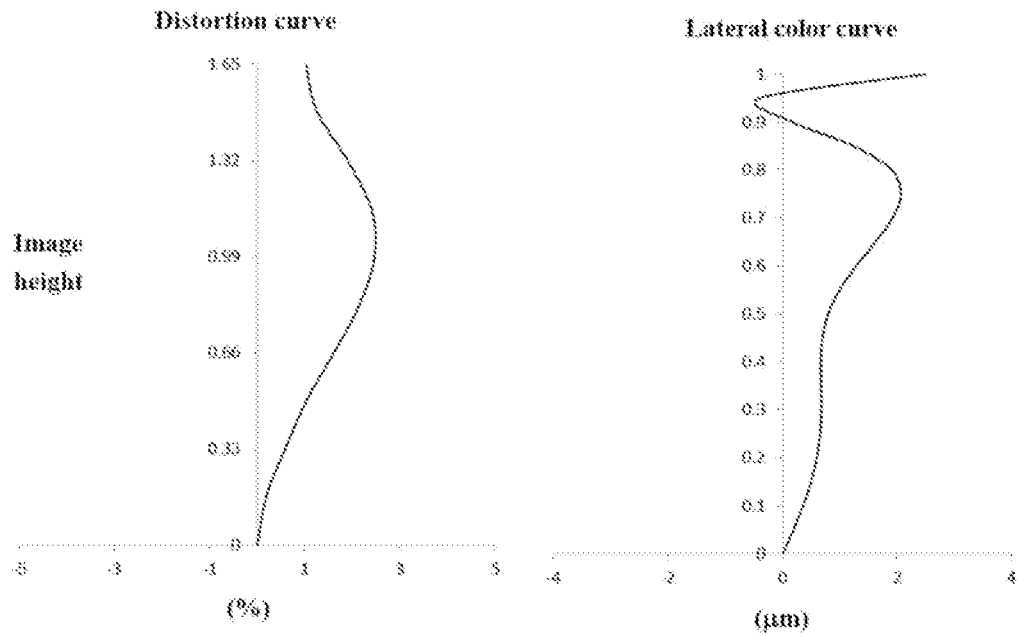

FIG. 10A shows a longitudinal aberration curve of the optical imaging system according to Embodiment 5, which represents the deviation of the converged focal point after light of different wavelengths passes through the lens assembly. FIG. 10B shows an astigmatism curve of the optical imaging system according to Embodiment 5, which represents the curvature of the tangential image plane and the curvature of the sagittal image plane. FIG. 10O shows a distortion curve of the optical imaging system according to Embodiment 5, which represents distortion magnitude values corresponding to different image heights. FIG. 10D shows a lateral color curve of the optical imaging system according to Embodiment 5, which represents the deviation of different image heights on the imaging plane after light passes through the lens assembly. According to FIGS. 10A to 10D, it can be seen that the optical imaging system given in Embodiment 5 can realize good imaging quality.

Embodiment 6

Figure 11:
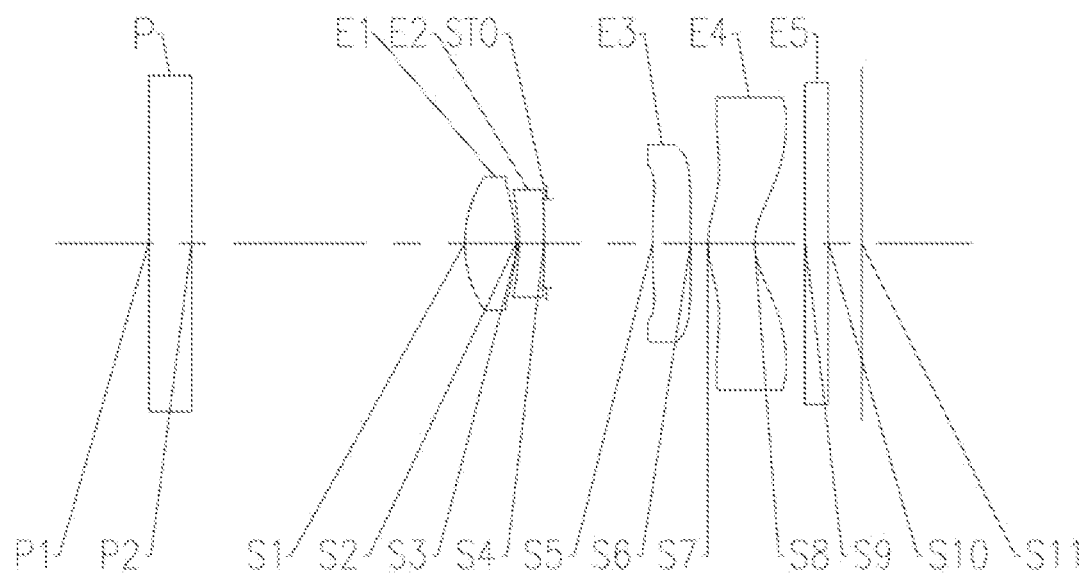
FIG. 11 shows a schematic structural diagram of an optical imaging system according to Embodiment 6 of the present application.

An optical imaging system according to Embodiment 6 of the present application will be described below with reference to FIGS. 11 to 12D. FIG. 11 shows a schematic structural diagram of the optical imaging system according to Embodiment 6 of the present application.

As shown in FIG. 11, the optical imaging system includes, in order from an object side to an image side along an optical axis: a planar glass P, a first lens E1, a second lens E2, a diaphragm STO, a third lens E3, a fourth lens E4, a filter E5 and an imaging plane S11.

The first lens E1 has a positive focal power, and has a convex object side surface S1 and a convex image side surface S2. The second lens E2 has a negative focal power, and has a concave object side surface S3 and a concave image side surface S4. The third lens E3 has a positive focal power, and has a convex object side surface S5 and a convex image side surface S6. The fourth lens E4 has a negative focal power, and has a convex object side surface S7 and a concave image side surface S8. The filter E5 has an object side surface S9 and an image side surface S10. Light from an object sequentially passes through the respective surfaces S1 to S10 and finally forms an image on the imaging plane S11.

Table 11 shows a table of basic parameters of the optical imaging system of Embodiment 6, wherein the units of the radius of curvature, thickness, and focal length are all millimeters (mm). Table 12 shows higher-order coefficients of each aspheric lens surface that are applicable in Embodiment 6, wherein the surface profile of each aspheric surface can be defined by formula (1) given in Embodiment 1 described above.

TABLE 11

Embodiment 6: f = 1.21 mm, TL = 6.70 mm, FOV = 48.1°

| Surface No. | Surface type | Radius of curvature | Thickness | Material Refractive index | Dispersion coefficient | Focal length | Conic coefficient |
|---|---|---|---|---|---|---|---|
| OBJ | Spherical | Infinity | 0.0500 | | | | |
| P1 | Spherical | Infinity | 0.4000 | 1.517 | 64.20 | | |
| P2 | Spherical | Infinity | 2.5500 | | | | |
| S1 | Aspherical | 1.1226 | 0.4802 | 1.546 | 56.11 | 1.16 | −3.6384 |
| S2 | Aspherical | −1.2280 | 0.0250 | | | | −8.2769 |
| S3 | Aspherical | −2.2462 | 0.2350 | 1.678 | 19.25 | −3.31 | 4.9195 |
| S4 | Aspherical | 1000.0000 | 0.0269 | | | | −99.0000 |
| STO | Spherical | Infinity | 0.9875 | | | | |
| S5 | Aspherical | 10.0000 | 0.3541 | 1.666 | 20.40 | 11.20 | −95.7589 |
| S6 | Aspherical | −29.0029 | 0.1628 | | | | 99.9900 |
| S7 | Aspherical | 0.7987 | 0.4337 | 1.546 | 56.11 | −5.84 | −8.2488 |
| S8 | Aspherical | 0.5162 | 0.4725 | | | | −1.1337 |
| S9 | Spherical | Infinity | 0.2100 | 1.517 | 64.20 | | |
| S10 | Spherical | Infinity | 0.3123 | | | | |
| S11 | Spherical | Infinity | | | | | |

TABLE 12

| Surface No. | A4 | A6 | A8 | A10 | A12 |
|---|---|---|---|---|---|
| S1 | 3.5758E−02 | 6.0893E−05 | −3.3705E−04 | −3.9687E−04 | −2.6662E−04 |
| S2 | 4.0042E−03 | −1.0722E−03 | −6.7706E−04 | −2.4433E−04 | −5.3877E−05 |
| S3 | 5.1459E−03 | −7.8929E−04 | −2.6031E−04 | −4.7289E−05 | −1.1840E−05 |
| S4 | −8.6139E−03 | 3.8588E−04 | −3.2190E−05 | 1.5758E−06 | 1.1347E−05 |
| S5 | −4.0550E−02 | −2.7330E−02 | −3.2207E−03 | −2.1646E−03 | −7.2937E−04 |
| S6 | −8.6351E−02 | −3.1270E−02 | −3.9870E−03 | −2.3373E−03 | −1.0029E−03 |
| S7 | −2.8760E−01 | 5.5969E−02 | −5.2424E−03 | −8.8584E−03 | 2.6398E−03 |
| S8 | −1.4729E+00 | 2.9475E−01 | −8.4048E−02 | 2.2067E−02 | −1.0001E−02 |

| Surface No. | A14 | A16 | A18 | A20 |
|---|---|---|---|---|
| S1 | −9.9648E−05 | −3.0868E−05 | 1.1640E−05 | 2.0081E−06 |
| S2 | 2.0144E−05 | 1.5569E−05 | 2.6997E−06 | 3.0345E−07 |
| S3 | 1.8631E−05 | 9.0170E−06 | 4.8820E−06 | −2.0504E−06 |
| S4 | 6.5780E−06 | 9.9465E−06 | 2.3526E−06 | 1.7099E−06 |
| S5 | −3.8025E−04 | −1.3237E−04 | −3.4638E−05 | −1.0677E−05 |
| S6 | −1.6350E−04 | 1.7317E−04 | 2.1719E−05 | 9.1708E−06 |
| S7 | −1.4024E−03 | 1.1668E−03 | −3.0606E−04 | 2.3597E−04 |
| S8 | 2.9580E−03 | −4.3317E−04 | 3.7191E−04 | −1.6299E−06 |

Figure 12A:
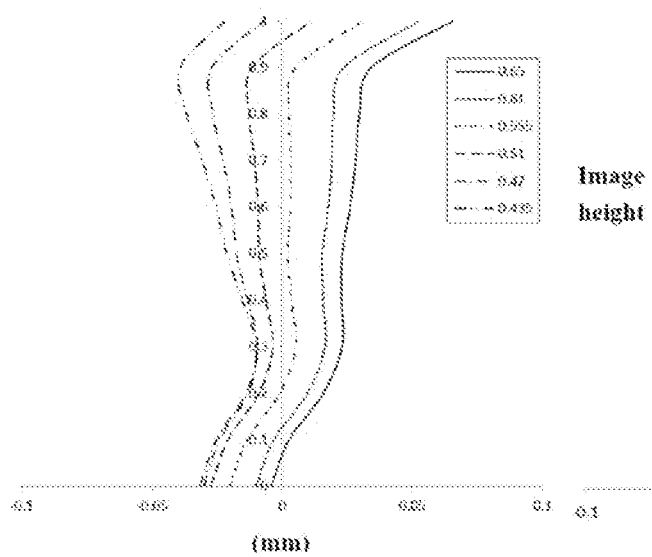
FIGS. 12A to 12D show a longitudinal aberration curve, astigmatism curve, distortion curve and lateral color curve of the optical imaging system according to Embodiment 6, respectively.
Figure 12B:
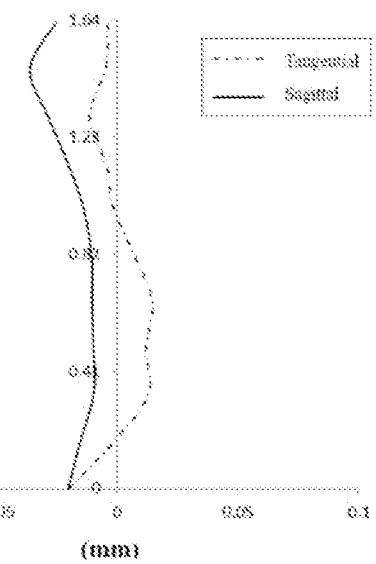
Figure 12C:
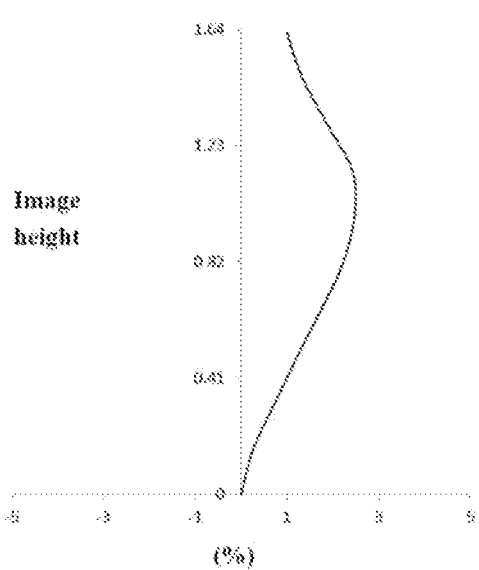
Figure 12D:
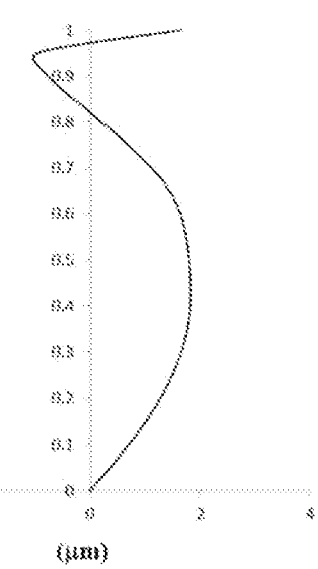

FIG. 12A shows a longitudinal aberration curve of the optical imaging system according to Embodiment 6, which represents the deviation of the converged focal point after light of different wavelengths passes through the lens assembly. FIG. 12B shows an astigmatism curve of the optical imaging system according to Embodiment 6, which represents the curvature of the tangential image plane and the curvature of the sagittal image plane. FIG. 12C shows a distortion curve of the optical imaging system according to Embodiment 6, which represents distortion magnitude values corresponding to different image heights. FIG. 12D shows a lateral color curve of the optical imaging system according to Embodiment 6, which represents the deviation of different image heights on the imaging plane after light passes through the lens assembly. According to FIGS. 12A to 12D, it can be seen that the optical imaging system given in Embodiment 6 can realize good imaging quality.

Embodiment 7

Figure 13:
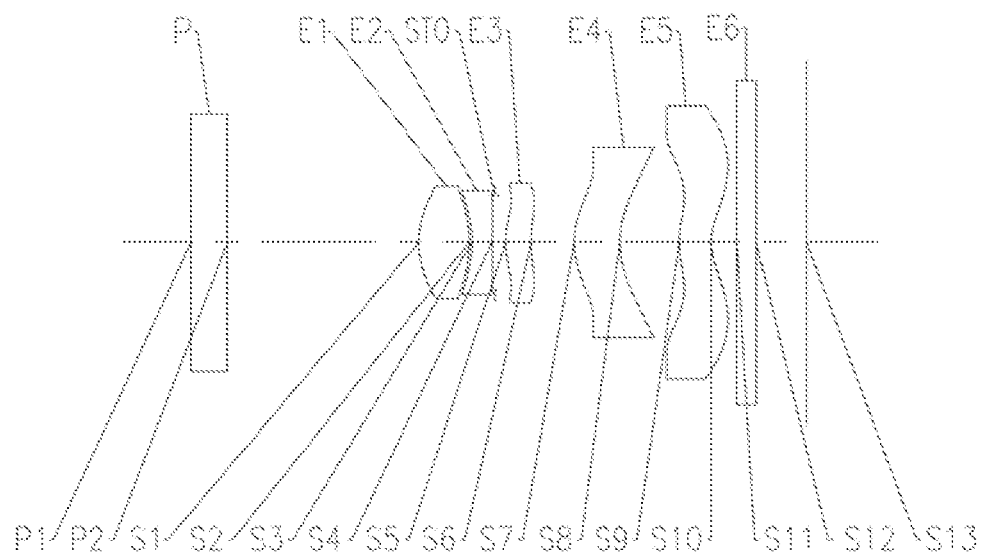
FIG. 13 shows a schematic structural diagram of an optical imaging system according to Embodiment 7 of the present application.

An optical imaging system according to Embodiment 7 of the present application will be described below with reference to FIGS. 13 to 14D. FIG. 13 shows a schematic structural diagram of the optical imaging system according to Embodiment 7 of the present application.

As shown in FIG. 13, the optical imaging system includes, in order from an object side to an image side along an optical axis: a planar glass P, a first lens E1, a second lens E2, a diaphragm STO, a third lens E3, a fourth lens E4, a fifth lens E5, a filter E6 and an imaging plane S13.

The first lens E1 has a positive focal power, and has a convex object side surface S1 and a convex image side surface S2. The second lens E2 has a negative focal power, and has a concave object side surface S3 and a concave image side surface S4. The third lens E3 has a positive focal power, and has a convex object side surface S5 and a concave image side surface S6. The fourth lens E4 has a positive focal power, and has a convex object side surface S7 and a concave image side surface S8. The fifth lens E5 has a negative focal power, and has a convex object side surface S9 and a concave image side surface S10. The filter E6 has an object side surface S11 and an image side surface S12. Light from an object sequentially passes through the respective surfaces S1 to S12 and finally forms an image on the imaging plane S13.

Table 13 shows a table of basic parameters of the optical imaging system of Embodiment 7, wherein the units of the radius of curvature, thickness, and focal length are all millimeters (mm). Table 14 shows higher-order coefficients of each aspheric lens surface that are applicable in Embodiment 7, wherein the surface profile of each aspheric surface can be defined by formula (1) given in Embodiment 1 described above.

TABLE 13

Embodiment 7: f = 1.05 mm, TL = 6.80 mm, FOV = 50.3°

| Surface No. | Surface type | Radius of curvature | Thickness | Material Refractive index | Dispersion coefficient | Focal length | Conic coefficient |
|---|---|---|---|---|---|---|---|
| OBJ | Spherical | Infinity | 0.0500 | | | | |
| P1 | Spherical | Infinity | 0.4000 | 1.517 | 64.20 | | |
| P2 | Spherical | Infinity | 2.1010 | | | | |
| S1 | Aspherical | 1.0147 | 0.5530 | 1.546 | 56.11 | 1.22 | −1.6800 |
| S2 | Aspherical | −1.5807 | 0.0316 | | | | −1.6211 |
| S3 | Aspherical | −1.3127 | 0.2200 | 1.678 | 19.25 | −1.51 | 3.0978 |
| S4 | Aspherical | 4.9184 | 0.0269 | | | | −64.2867 |
| STO | Spherical | Infinity | 0.1222 | | | | |
| S5 | Aspherical | 0.9220 | 0.2800 | 1.666 | 20.40 | 3.11 | −20.6161 |
| S6 | Aspherical | 1.4580 | 0.4721 | | | | −18.4084 |
| S7 | Aspherical | 0.8692 | 0.5005 | 1.546 | 56.11 | 5.09 | −2.4482 |
| S8 | Aspherical | 1.0079 | 0.6535 | | | | −0.7312 |
| S9 | Aspherical | 1.0200 | 0.3500 | 1.546 | 56.11 | −4.11 | −32.9659 |
| S10 | Aspherical | 0.6160 | 0.2806 | | | | −2.0542 |
| S11 | Spherical | Infinity | 0.2100 | 1.517 | 64.20 | | |
| S12 | Spherical | Infinity | 0.5486 | | | | |
| S13 | Spherical | Infinity | | | | | |

TABLE 14

| Surface No. | A4 | A6 | A8 | A10 | A12 |
|---|---|---|---|---|---|
| S1 | 1.0463E−01 | −3.0478E−01 | 3.1682E+00 | −3.2878E+01 | 1.9658E+02 |
| S2 | −8.8645E−01 | 1.4050E+01 | −1.1934E+02 | 4.7926E+02 | −1.2757E+02 |
| S3 | −8.5708E−01 | 2.2264E+01 | −2.0609E+02 | 1.0562E+03 | −2.2907E+03 |
| S4 | −1.5662E+00 | 1.8989E+01 | −1.6475E+02 | 9.3222E+02 | −3.1335E+03 |
| S5 | 1.1447E+00 | −2.0998E+01 | 2.3553E+02 | −2.0028E+03 | 1.1731E+04 |
| S6 | −5.8344E−01 | 1.2603E+00 | −6.3864E+00 | 2.8812E+00 | 1.0190E+02 |
| S7 | −2.1126E−01 | 7.6329E−01 | −3.7361E+00 | 9.3484E+00 | −1.4258E+01 |
| S8 | −3.5097E−01 | 1.5284E+00 | −6.3392E+00 | 1.5776E+01 | −2.6716E+01 |
| S9 | 1.5323E+00 | −2.0339E+01 | 1.2234E+02 | −4.9764E+02 | 1.4391E+03 |
| S10 | −1.1410E+00 | 1.6570E+00 | −3.9502E−01 | −4.6404E+00 | 1.2430E+01 |

| Surface No. | A14 | A16 | A18 | A20 |
|---|---|---|---|---|
| S1 | −7.4242E+02 | 1.6863E+03 | −2.1261E+03 | 1.1395E+03 |
| S2 | −6.9019E+03 | 2.8561E+04 | −4.9421E+04 | 3.2859E+04 |
| S3 | −3.2719E+03 | 3.0774E+04 | −6.6705E+04 | 5.1137E+04 |
| S4 | 4.4436E+03 | 5.9327E+03 | −3.0171E+04 | 3.1139E+04 |
| S5 | −4.5781E+04 | 1.1291E+05 | −1.5880E+05 | 9.6758E+04 |
| S6 | −5.6816E+02 | 1.5372E+03 | −2.1824E+03 | 1.2959E+03 |
| S7 | 8.7117E+00 | 6.7479E+00 | −1.2642E+01 | 5.0307E+00 |
| S8 | 3.1083E+01 | −2.3236E+01 | 9.8601E+00 | −1.7884E+00 |
| S9 | −3.0017E+03 | 4.5368E+03 | −4.9527E+03 | 3.8553E+03 |
| S10 | −1.8153E+01 | 1.7785E+01 | −1.2395E+01 | 6.2483E+00 |

| Surface No. | A22 | A24 | A26 | A28 |
|---|---|---|---|---|
| S1 | 0.0000E+00 | 0.0000E+00 | 0.0000E+00 | 0.0000E+00 |
| S2 | 0.0000E+00 | 0.0000E+00 | 0.0000E+00 | 0.0000E+00 |
| S3 | 0.0000E+00 | 0.0000E+00 | 0.0000E+00 | 0.0000E+00 |
| S4 | 0.0000E+00 | 0.0000E+00 | 0.0000E+00 | 0.0000E+00 |
| S5 | 0.0000E+00 | 0.0000E+00 | 0.0000E+00 | 0.0000E+00 |
| S6 | 0.0000E+00 | 0.0000E+00 | 0.0000E+00 | 0.0000E+00 |
| S7 | 0.0000E+00 | 0.0000E+00 | 0.0000E+00 | 0.0000E+00 |
| S8 | 0.0000E+00 | 0.0000E+00 | 0.0000E+00 | 0.0000E+00 |
| S9 | −2.0824E+03 | 7.4061E+02 | −1.5580E+02 | 1.4676E+01 |
| S10 | −2.2513E+00 | 5.5305E−01 | −8.3019E−02 | 5.7234E−03 |

Figures 14A, 14B:
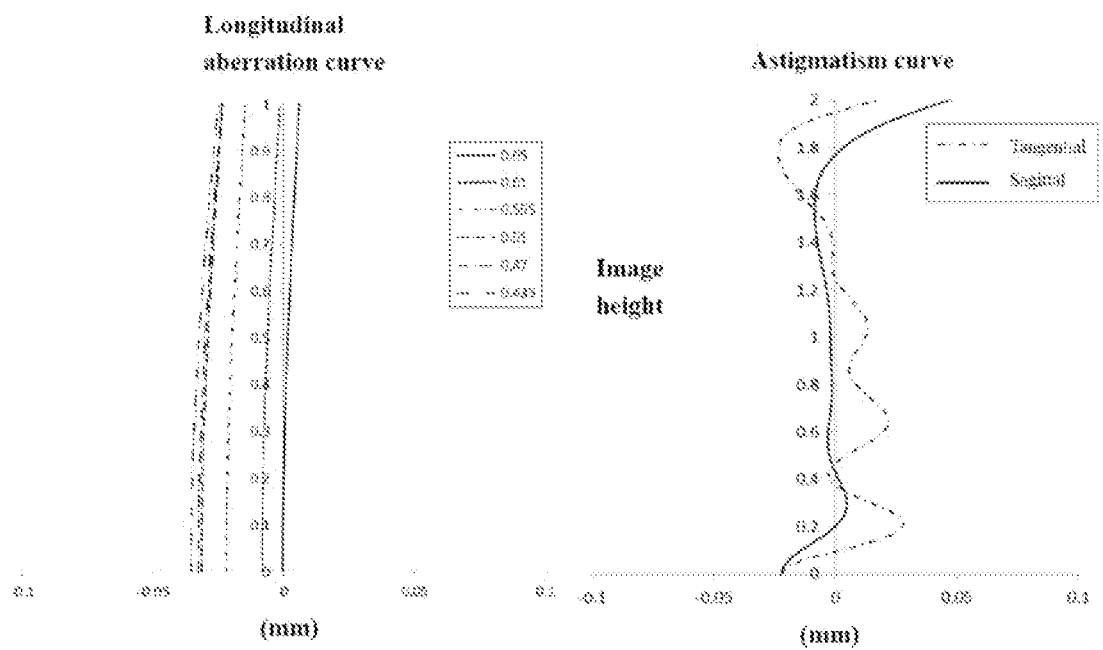
FIGS. 14A to 14D show a longitudinal aberration curve, astigmatism curve, distortion curve and lateral color curve of the optical imaging system according to Embodiment 7, respectively.
Figures 14C, 14D:
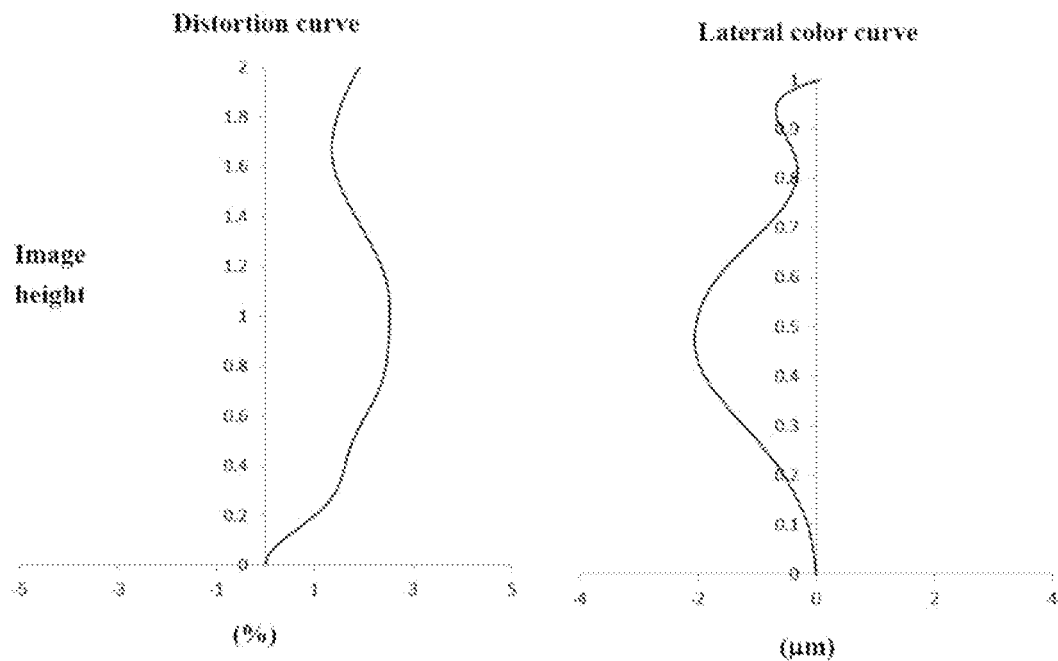

FIG. 14A shows a longitudinal aberration curve of the optical imaging system according to Embodiment 7, which represents the deviation of the converged focal point after light of different wavelengths passes through the lens assembly. FIG. 14B shows an astigmatism curve of the optical imaging system according to Embodiment 7, which represents the curvature of the tangential image plane and the curvature of the sagittal image plane. FIG. 14C shows a distortion curve of the optical imaging system according to Embodiment 7, which represents distortion magnitude values corresponding to different image heights. FIG. 14D shows a lateral color curve of the optical imaging system according to Embodiment 7, which represents the deviation of different image heights on the imaging plane after light passes through the lens assembly. According to FIGS. 14A to 14D, it can be seen that the optical imaging system given in Embodiment 7 can realize good imaging quality.

Embodiment 8

Figure 15:
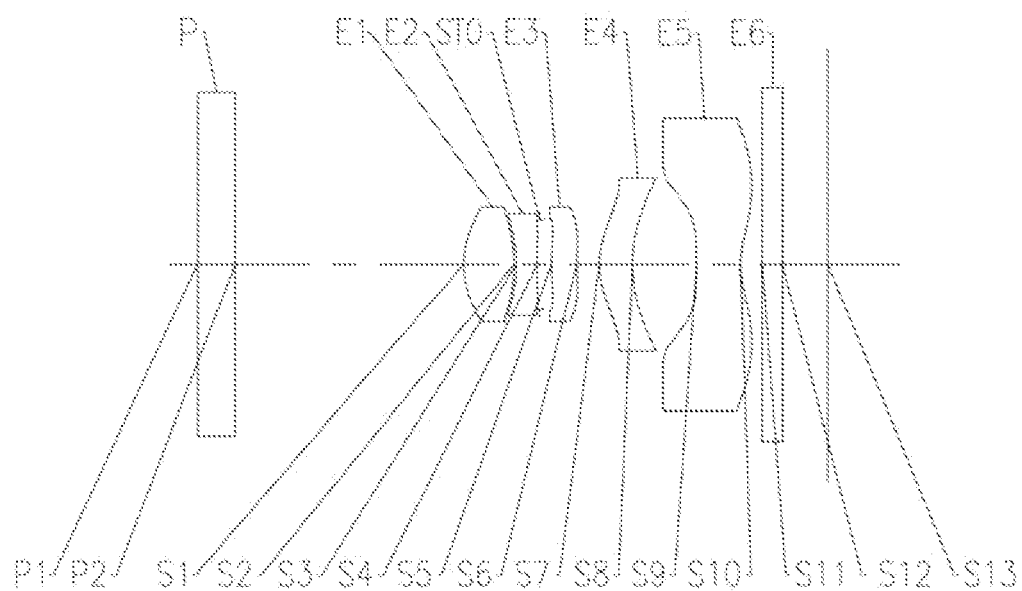
FIG. 15 shows a schematic structural diagram of an optical imaging system according to Embodiment 8 of the present application.

An optical imaging system according to Embodiment 8 of the present application will be described below with reference to FIGS. 15 to 16D. FIG. 15 shows a schematic structural diagram of the optical imaging system according to Embodiment 8 of the present application.

As shown in FIG. 15, the optical imaging system includes, in order from an object side to an image side along an optical axis: a planar glass P, a first lens E1, a second lens E2, a diaphragm STO, a third lens E3, a fourth lens E4, a fifth lens E5, a filter E6 and an imaging plane S13.

The first lens E1 has a positive focal power, and has a convex object side surface S1 and a convex image side surface S2. The second lens E2 has a negative focal power, and has a concave object side surface S3 and a concave image side surface S4. The third lens E3 has a positive focal power, and has a convex object side surface S5 and a concave image side surface S6. The fourth lens E4 has a positive focal power, and has a convex object side surface S7 and a concave image side surface S8. The fifth lens E5 has a negative focal power, and has a concave object side surface S9 and a concave image side surface S10. The filter E6 has an object side surface S11 and an image side surface S12. Light from an object sequentially passes through the respective surfaces S1 to S12 and finally forms an image on the imaging plane S13.

Table 15 shows a table of basic parameters of the optical imaging system of Embodiment 8, wherein the units of the radius of curvature, thickness, and focal length are all millimeters (mm). Table 16 shows higher-order coefficients of each aspheric lens surface that are applicable in Embodiment 8, wherein the surface profile of each aspheric surface can be defined by formula (1) given in Embodiment 1 described above.

TABLE 15

Embodiment 8: f = 1.06 mm, TL = 6.68 mm, FOV = 56.0°

| Surface No. | Surface type | Radius of curvature | Thickness | Refractive index | Dispersion coefficient | Focal length | Conic coefficient |
|---|---|---|---|---|---|---|---|
| OBJ | Spherical | Infinity | 0.0500 | | | | |
| P1 | Spherical | Infinity | 0.4000 | 1.517 | 64.20 | | |
| P2 | Spherical | Infinity | 2.4043 | | | | |
| S1 | Aspherical | 0.9553 | 0.5285 | 1.546 | 56.11 | 1.19 | −0.4965 |
| S2 | Aspherical | −1.6397 | 0.0250 | | | | −3.0774 |
| S3 | Aspherical | −1.5590 | 0.2200 | 1.678 | 19.25 | −1.56 | 5.5723 |
| S4 | Aspherical | 3.4293 | 0.0287 | | | | −14.7488 |
| STO | Spherical | Infinity | 0.1204 | | | | |
| S5 | Aspherical | 1.5430 | 0.2679 | 1.666 | 20.40 | 4.93 | −70.4911 |
| S6 | Aspherical | 2.7089 | 0.2360 | | | | −81.3036 |
| S7 | Aspherical | 0.8243 | 0.3500 | 1.546 | 56.11 | 2.66 | −3.9410 |
| S8 | Aspherical | 1.6208 | 0.6749 | | | | −0.1930 |
| S9 | Aspherical | −500.0000 | 0.4597 | 1.536 | 55.74 | −1.86 | −99.0000 |
| S10 | Aspherical | 1.0029 | 0.2253 | | | | −1.5780 |
| S11 | Spherical | Infinity | 0.2100 | 1.517 | 64.20 | | |
| S12 | Spherical | Infinity | 0.4793 | | | | |
| S13 | Spherical | Infinity | | | | | |

TABLE 16

| Surface No. | A4 | A6 | A8 | A10 | A12 |
|---|---|---|---|---|---|
| S1 | −1.8309E−02 | −5.0521E−03 | −1.0390E−03 | −1.8718E−04 | −2.1210E−05 |
| S2 | −3.6084E−03 | −1.3297E−03 | −8.8805E−05 | 1.6885E−04 | −1.5282E−04 |
| S3 | 3.2286E−02 | 7.2372E−03 | 1.3118E−04 | 5.2682E−04 | −1.2882E−04 |
| S4 | −3.6383E−02 | 3.6433E−03 | −1.0969E−03 | 2.0578E−04 | −6.6052E−05 |
| S5 | −5.4017E−02 | −6.2953E−03 | 1.6750E−04 | −4.3465E−04 | 1.1056E−04 |
| S6 | −1.2317E−01 | 6.3706E−03 | −7.8307E−04 | 4.7105E−04 | 5.7121E−05 |
| S7 | −6.3944E−02 | −3.2026E−03 | −1.0252E−03 | 4.2180E−04 | 2.9907E−04 |
| S8 | −2.7508E−02 | −4.2195E−03 | 1.5148E−03 | −3.0813E−04 | 3.9469E−04 |
| S9 | −4.7921E−01 | 1.3661E−01 | −1.5580E−03 | −2.8905E−03 | −1.6751E−03 |
| S10 | −1.1788E+00 | 2.5170E−01 | −6.4447E−02 | 2.0049E−02 | −7.2162E−03 |

TABLE 16-continued

| Surface No. | A14 | A16 | A18 | A20 |
|---|---|---|---|---|
| S1 | −3.2815E−06 | 4.1147E−06 | 2.6006E−06 | 4.6029E−06 |
| S2 | 1.1077E−04 | −3.6608E−05 | 1.2012E−05 | 4.4920E−06 |
| S3 | 1.2960E−04 | −3.1866E−05 | 1.7449E−05 | 2.7859E−06 |
| S4 | 2.8877E−05 | −2.8893E−06 | 1.8760E−06 | 2.3924E−06 |
| S5 | −3.2869E−05 | 2.9513E−05 | 2.2057E−06 | 5.2991E−06 |
| S6 | 7.2000E−05 | 2.3179E−05 | 1.1571E−05 | 5.4924E−06 |
| S7 | 2.1775E−04 | −7.7091E−06 | −7.6384E−07 | −8.6559E−06 |
| S8 | −7.7227E−06 | −9.6753E−05 | 1.4327E−06 | 2.0520E−05 |
| S9 | 1.6148E−04 | 1.7175E−05 | −8.9120E−05 | −4.1413E−05 |
| S10 | 2.2414E−03 | −8.8725E−04 | −7.2092E−05 | −7.0897E−05 |

| Surface No. | A22 | A24 | A26 | A28 |
|---|---|---|---|---|
| S1 | 0.0000E+00 | 0.0000E+00 | 0.0000E+00 | 0.0000E+00 |
| S2 | 0.0000E+00 | 0.0000E+00 | 0.0000E+00 | 0.0000E+00 |
| S3 | 0.0000E+00 | 0.0000E+00 | 0.0000E+00 | 0.0000E+00 |
| S4 | 0.0000E+00 | 0.0000E+00 | 0.0000E+00 | 0.0000E+00 |
| S5 | 0.0000E+00 | 0.0000E+00 | 0.0000E+00 | 0.0000E+00 |
| S6 | 0.0000E+00 | 0.0000E+00 | 0.0000E+00 | 0.0000E+00 |
| S7 | 0.0000E+00 | 0.0000E+00 | 0.0000E+00 | 0.0000E+00 |
| S8 | 0.0000E+00 | 0.0000E+00 | 0.0000E+00 | 0.0000E+00 |
| S9 | 6.9070E−05 | −6.1636E−06 | 2.1697E−05 | −3.7148E−05 |
| S10 | −1.4049E−04 | 2.8544E−05 | −3.0474E−05 | 2.8420E−05 |

Figure 16A:
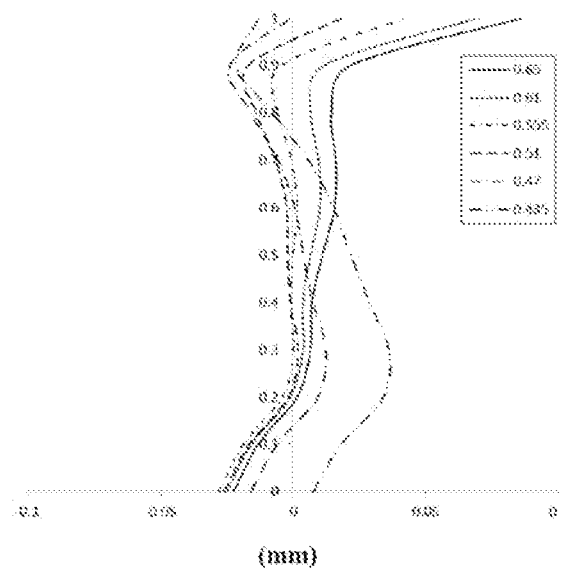
FIGS. 16A to 16D show a longitudinal aberration curve, astigmatism curve, distortion curve and lateral color curve of the optical imaging system according to Embodiment 8, respectively.
Figure 16B:
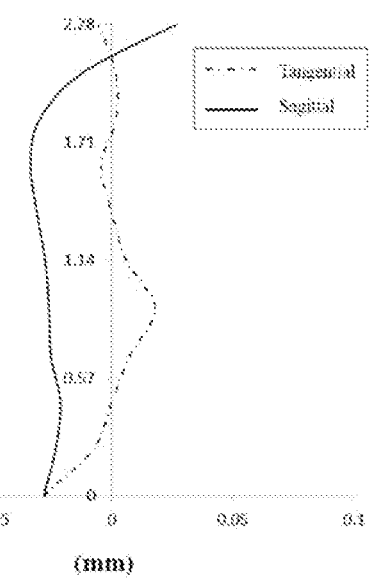
Figure 16C:
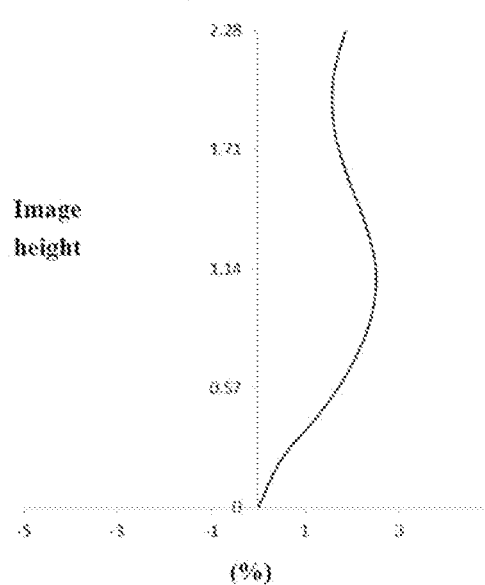
Figure 16D:
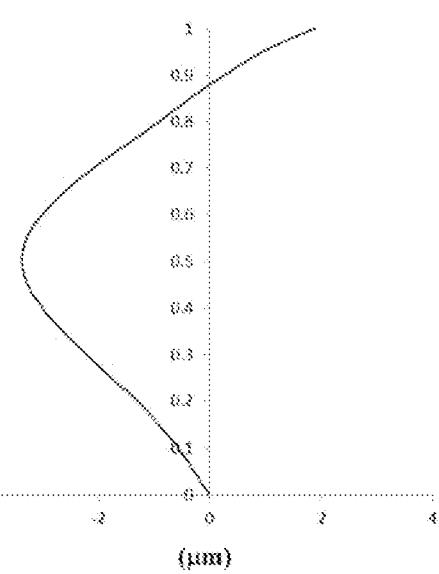

FIG. 16A shows a longitudinal aberration curve of the optical imaging system according to Embodiment 8, which represents the deviation of the converged focal point after light of different wavelengths passes through the lens assembly. FIG. 16B shows an astigmatism curve of the optical imaging system according to Embodiment 8, which represents the curvature of the tangential image plane and the curvature of the sagittal image plane. FIG. 16C shows a distortion curve of the optical imaging system according to Embodiment 8, which represents distortion magnitude values corresponding to different image heights. FIG. 16D shows a lateral color curve of the optical imaging system according to Embodiment 8, which represents the deviation of different image heights on the imaging plane after light passes through the lens assembly. According to FIGS. 16A to 16D, it can be seen that the optical imaging system given in Embodiment 8 can realize good imaging quality.

Embodiment 9

Figure 17:
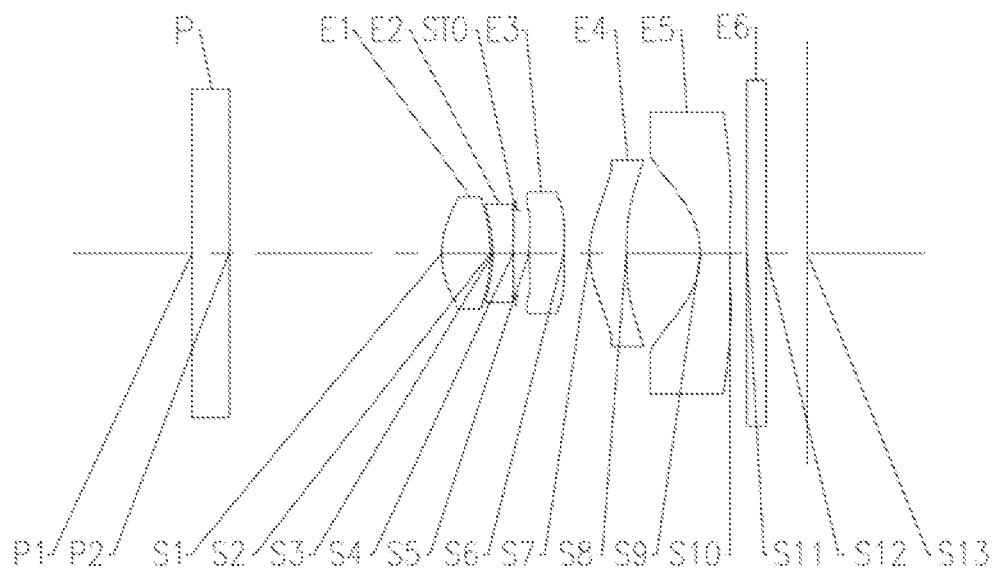
FIG. 17 shows a schematic structural diagram of an optical imaging system according to Embodiment 9 of the present application.

An optical imaging system according to Embodiment 9 of the present application will be described below with reference to FIGS. 17 to 18D. FIG. 17 shows a schematic structural diagram of the optical imaging system according to Embodiment 9 of the present application.

As shown in FIG. 17, the optical imaging system includes, in order from an object side to an image side along an optical axis: a planar glass P, a first lens E1, a second lens E2, a diaphragm STO, a third lens E3, a fourth lens E4, a fifth lens E5, a filter E6 and an imaging plane S13.

The first lens E1 has a positive focal power, and has a convex object side surface S1 and a convex image side surface S2. The second lens E2 has a negative focal power, and has a concave object side surface S3 and a concave image side surface S4. The third lens E3 has a positive focal power, and has a convex object side surface S5 and a concave image side surface S6. The fourth lens E4 has a positive focal power, and has a convex object side surface S7 and a concave image side surface S8. The fifth lens E5 has a negative focal power, and has a concave object side surface S9 and a convex image side surface S10. The filter E6 has an object side surface S11 and an image side surface S12. Light from an object sequentially passes through the respective surfaces S1 to S12 and finally forms an image on the imaging plane S13.

Table 17 shows a table of basic parameters of the optical imaging system of Embodiment 9, wherein the units of the radius of curvature, thickness, and focal length are all millimeters (mm). Table 18 shows higher-order coefficients of each aspheric lens surface that are applicable in Embodiment 9, wherein the surface profile of each aspheric surface can be defined by formula (1) given in Embodiment 1 described above.

TABLE 17

Embodiment 9: f = 1.08 mm, TL = 6.70 mm, FOV = 56.4°

| Surface No. | Surface type | Radius of curvature | Thickness | Material Refractive index | Material Dispersion coefficient | Focal length | Conic coefficient |
|---|---|---|---|---|---|---|---|
| OBJ | Spherical | Infinity | 0.0500 | | | | |
| P1 | Spherical | Infinity | 0.4000 | 1.517 | 64.20 | | |
| P2 | Spherical | Infinity | 2.3000 | | | | |
| S1 | Aspherical | 0.9544 | 0.5282 | 1.546 | 56.11 | 1.20 | −0.4672 |
| S2 | Aspherical | −1.6730 | 0.0257 | | | | −3.6566 |
| S3 | Aspherical | −1.6043 | 0.2200 | 1.678 | 19.25 | −1.66 | 5.6467 |
| S4 | Aspherical | 3.9832 | 0.0288 | | | | −10.2692 |

TABLE 17-continued

Embodiment 9: f = 1.08 mm, TL = 6.70 mm, FOV = 56.4°

| Surface No. | Surface type | Radius of curvature | Thickness | Material Refractive index | Dispersion coefficient | Focal length | Conic coefficient |
|---|---|---|---|---|---|---|---|
| STO | Spherical | Infinity | 0.1424 | | | | |
| S5 | Aspherical | 1.9495 | 0.3797 | 1.666 | 20.40 | 6.27 | −93.2170 |
| S6 | Aspherical | 3.3696 | 0.2755 | | | | −69.4484 |
| S7 | Aspherical | 0.9404 | 0.3988 | 1.546 | 56.11 | 2.13 | −3.9811 |
| S8 | Aspherical | 4.1843 | 0.8005 | | | | 7.5753 |
| S9 | Aspherical | −0.8756 | 0.3200 | 1.536 | 55.74 | −1.63 | −5.8034 |
| S10 | Aspherical | −1000.0000 | 0.1829 | | | | −99.0000 |
| S11 | Spherical | Infinity | 0.2100 | 1.517 | 64.20 | | |
| S12 | Spherical | Infinity | 0.4374 | | | | |
| S13 | Spherical | Infinity | | | | | |

TABLE 18

| Surface No. | A4 | A6 | A8 | A10 | A12 |
|---|---|---|---|---|---|
| S1 | −1.6865E−02 | −5.2413E−03 | −1.1706E−03 | −2.3021E−04 | −4.5387E−05 |
| S2 | −8.0683E−04 | −2.9134E−03 | −5.9966E−04 | 7.6771E−04 | −4.3815E−04 |
| S3 | 2.9973E−02 | 6.1080E−03 | −8.1603E−04 | 1.0577E−03 | −4.1563E−04 |
| S4 | −3.3341E−02 | 5.1513E−03 | −1.3116E−03 | 3.1555E−04 | −9.4262E−05 |
| S5 | −5.7673E−02 | −9.7832E−04 | −3.3458E−04 | −2.5532E−04 | 2.6056E−05 |
| S6 | −1.4483E−01 | 1.4178E−02 | −1.9515E−03 | 5.0198E−04 | −7.4377E−05 |
| S7 | −6.8818E−02 | −1.1472E−03 | −1.7474E−03 | 1.0255E−03 | 2.1780E−04 |
| S8 | 6.3800E−02 | −2.5686E−02 | 4.4071E−03 | 1.5175E−03 | 5.1477E−04 |
| S9 | −2.7991E−01 | 8.3160E−02 | −9.1520E−03 | 2.4454E−03 | 2.9736E−03 |
| S10 | −7.0011E−02 | −7.0495E−03 | 1.2698E−02 | −9.8901E−03 | 7.9717E−03 |

| Surface No. | A14 | A16 | A18 | A20 |
|---|---|---|---|---|
| S1 | −1.8904E−05 | 1.3838E−06 | 3.7639E−06 | 8.5778E−06 |
| S2 | 1.5995E−04 | −3.4969E−05 | 8.0596E−06 | 4.9983E−06 |
| S3 | 1.6047E−04 | −3.9593E−05 | 1.2557E−05 | 1.5895E−06 |
| S4 | 2.5250E−05 | −2.3542E−06 | −5.8385E−07 | 6.8237E−07 |
| S5 | −3.2004E−05 | 7.5396E−06 | −5.7956E−07 | 6.0226E−07 |
| S6 | 1.8747E−05 | 6.0854E−06 | 8.8253E−06 | 8.4250E−06 |
| S7 | −2.1974E−04 | −4.9571E−05 | 2.6119E−05 | 1.5227E−05 |
| S8 | −9.1378E−04 | −1.0540E−04 | 6.9269E−05 | 1.3392E−05 |
| S9 | −6.2827E−04 | −7.4065E−04 | −4.5743E−04 | −4.9378E−05 |
| S10 | −4.6670E−03 | 2.3139E−03 | −1.5398E−03 | 7.9606E−04 |

| Surface No. | A22 | A24 | A26 | A28 |
|---|---|---|---|---|
| S1 | 0.0000E+00 | 0.0000E+00 | 0.0000E+00 | 0.0000E+00 |
| S2 | 0.0000E+00 | 0.0000E+00 | 0.0000E+00 | 0.0000E+00 |
| S3 | 0.0000E+00 | 0.0000E+00 | 0.0000E+00 | 0.0000E+00 |
| S4 | 0.0000E+00 | 0.0000E+00 | 0.0000E+00 | 0.0000E+00 |
| S5 | 0.0000E+00 | 0.0000E+00 | 0.0000E+00 | 0.0000E+00 |
| S6 | 0.0000E+00 | 0.0000E+00 | 0.0000E+00 | 0.0000E+00 |
| S7 | 0.0000E+00 | 0.0000E+00 | 0.0000E+00 | 0.0000E+00 |
| S8 | 0.0000E+00 | 0.0000E+00 | 0.0000E+00 | 0.0000E+00 |
| S9 | 1.7079E−04 | −4.7103E−06 | 7.7906E−05 | −7.4149E−05 |
| S10 | −4.3664E−04 | 2.2685E−04 | −5.2700E−05 | 2.1394E−05 |

Figures 18A, 18B:
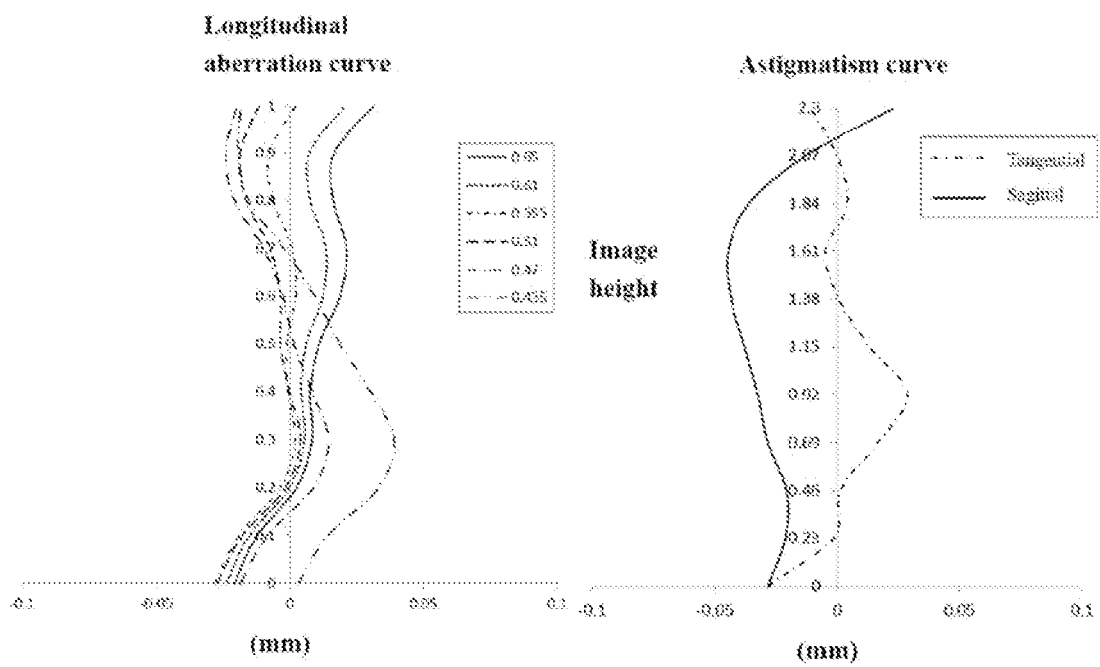
FIGS. 18A to 18D show a longitudinal aberration curve, astigmatism curve, distortion curve and lateral color curve of the optical imaging system according to Embodiment 9, respectively.
Figure 18C:
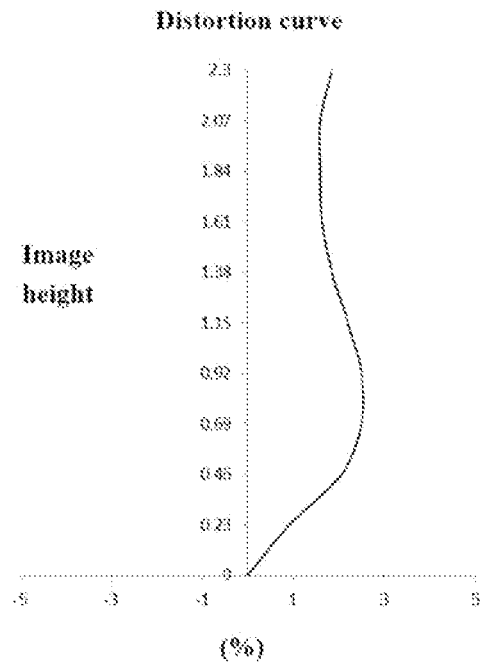
Figure 18D:
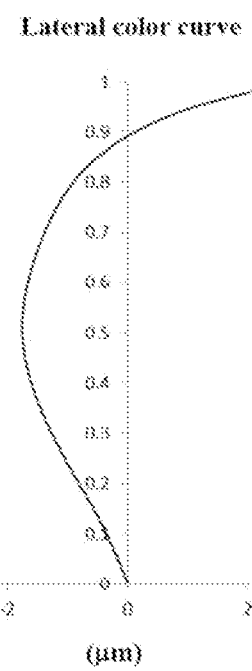

FIG. 18A shows a longitudinal aberration curve of the optical imaging system according to Embodiment 9, which represents the deviation of the converged focal point after light of different wavelengths passes through the lens assembly. FIG. 18B shows an astigmatism curve of the optical imaging system according to Embodiment 9, which represents the curvature of the tangential image plane and the curvature of the sagittal image plane. FIG. 18C shows a distortion curve of the optical imaging system according to Embodiment 9, which represents distortion magnitude values corresponding to different image heights. FIG. 18D shows a lateral color curve of the optical imaging system according to Embodiment 9, which represents the deviation of different image heights on the imaging plane after light passes through the lens assembly. According to FIGS. 18A to 18D, it can be seen that the optical imaging system given in Embodiment 9 can realize good imaging quality.

Embodiment 10

Figure 19:
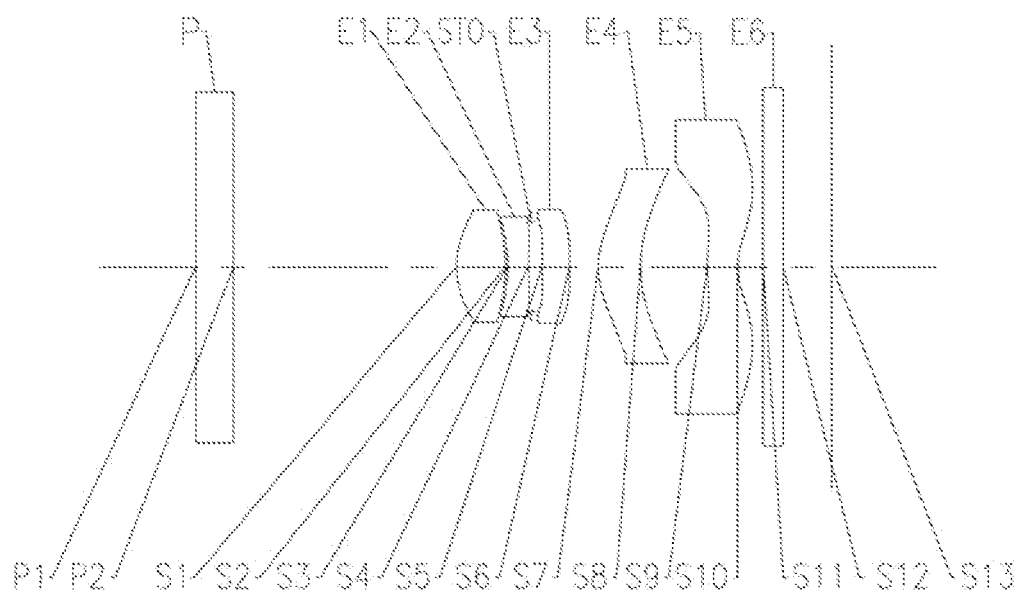
FIG. 19 shows a schematic structural diagram of an optical imaging system according to Embodiment 10 of the present application.

An optical imaging system according to Embodiment 10 of the present application will be described below with reference to FIGS. 19 to 20D. FIG. 19 shows a schematic structural diagram of the optical imaging system according to Embodiment 10 of the present application.

As shown in FIG. 19, the optical imaging system includes, in order from an object side to an image side along an optical axis: a planar glass P, a first lens E1, a second lens E2, a diaphragm STO, a third lens E3, a fourth lens E4, a fifth lens E5, a filter E6 and an imaging plane S13.

The first lens E1 has a positive focal power, and has a convex object side surface S1 and a convex image side surface S2. The second lens E2 has a negative focal power, and has a concave object side surface S3 and a concave image side surface S4. The third lens E3 has a positive focal power, and has a convex object side surface S5 and a convex image side surface S6. The fourth lens E4 has a positive focal power, and has a convex object side surface S7 and a concave image side surface S8. The fifth lens E5 has a negative focal power, and has a convex object side surface S9 and a concave image side surface S10. The filter E6 has an object side surface S11 and an image side surface S12. Light from an object sequentially passes through the respective surfaces S1 to S12 and finally forms an image on the imaging plane S13.

Table 19 shows a table of basic parameters of the optical imaging system of Embodiment 10, wherein the units of the radius of curvature, thickness, and focal length are all millimeters (mm). Table 20 shows higher-order coefficients of each aspheric lens surface that are applicable in Embodiment 10, wherein the surface profile of each aspheric surface can be defined by formula (1) given in Embodiment 1 described above.

TABLE 19

Embodiment 10: f = 1.08 mm, TL = 6.75 mm, FOV = 58.0°

| Surface No. | Surface type | Radius of curvature | Thickness | Refractive index | Dispersion coefficient | Focal length | Conic coefficient |
|---|---|---|---|---|---|---|---|
| OBJ | Spherical | Infinity | 0.0500 | | | | |
| P1 | Spherical | Infinity | 0.4000 | 1.517 | 64.20 | | |
| P2 | Spherical | Infinity | 2.3500 | | | | |
| S1 | Aspherical | 0.9581 | 0.5138 | 1.546 | 56.11 | 1.19 | −0.6740 |
| S2 | Aspherical | −1.6169 | 0.0250 | | | | −6.2906 |
| S3 | Aspherical | −1.5907 | 0.2200 | 1.678 | 19.25 | −1.75 | 5.4464 |
| S4 | Aspherical | 4.9391 | 0.0241 | | | | 10.0918 |
| STO | Spherical | Infinity | 0.1199 | | | | |
| S5 | Aspherical | 5.0000 | 0.2880 | 1.666 | 20.40 | 7.16 | −99.0000 |
| S6 | Aspherical | −102.6072 | 0.3025 | | | | 99.9900 |
| S7 | Aspherical | 0.8643 | 0.4448 | 1.546 | 56.11 | 3.27 | −3.3285 |
| S8 | Aspherical | 1.3712 | 0.7030 | | | | −0.9591 |
| S9 | Aspherical | 1.4441 | 0.3200 | 1.536 | 55.74 | −2.47 | −49.8365 |
| S10 | Aspherical | 0.6375 | 0.2634 | | | | −2.1309 |
| S11 | Spherical | Infinity | 0.2100 | 1.517 | 64.20 | | |
| S12 | Spherical | Infinity | 0.5155 | | | | |
| S13 | Spherical | Infinity | | | | | |

TABLE 20

| Surface No. | A4 | A6 | A8 | A10 | A12 |
|---|---|---|---|---|---|
| S1 | −6.6144E−03 | −3.3137E−03 | −8.7991E−04 | −2.0522E−04 | −4.5818E−05 |
| S2 | 2.5660E−03 | −4.8785E−03 | 1.2930E−03 | −5.3153E−04 | 1.4593E−04 |
| S3 | 3.1655E−02 | 1.1550E−03 | 1.6140E−03 | −3.5288E−04 | 1.4382E−04 |
| S4 | −3.0822E−02 | 2.7158E−04 | −4.1970E−06 | −4.8905E−04 | 1.6033E−05 |
| S5 | −6.7353E−02 | −1.3815E−03 | −6.5760E−06 | 1.2350E−04 | 1.4436E−05 |
| S6 | −9.5933E−02 | 8.0250E−03 | 6.8149E−04 | 4.8025E−04 | 5.3911E−05 |
| S7 | −6.5094E−02 | 2.9226E−03 | 1.0189E−03 | 2.1011E−04 | −1.2685E−04 |
| S8 | −9.1796E−02 | 3.3353E−03 | 2.5561E−03 | −5.9911E−04 | −2.4953E−04 |
| S9 | −5.7046E−01 | 1.1014E−01 | 1.7100E−03 | −5.4055E−03 | 2.0807E−03 |
| S10 | −1.2833E+00 | 3.2165E−01 | −1.0047E−01 | 3.3213E−02 | −1.4633E−02 |

| Surface No. | A14 | A16 | A18 | A20 |
|---|---|---|---|---|
| S1 | −6.7261E−06 | −2.3306E−06 | 1.3645E−06 | 2.6722E−06 |
| S2 | −1.4837E−05 | 1.1048E−05 | −1.5118E−06 | 4.7294E−06 |
| S3 | −4.8525E−06 | 7.5258E−06 | 1.2852E−06 | 3.0580E−06 |
| S4 | −2.4404E−07 | 2.0788E−06 | −2.3051E−06 | 1.7636E−06 |
| S5 | 1.7348E−05 | 4.0448E−06 | 8.1710E−06 | 2.2710E−06 |
| S6 | 3.5492E−05 | 1.5440E−05 | 9.4235E−06 | 6.5483E−06 |
| S7 | 1.6756E−04 | −1.0891E−07 | −2.1247E−05 | −2.9609E−05 |
| S8 | 2.7483E−04 | −6.4631E−06 | −8.1749E−06 | −3.5031E−05 |
| S9 | −1.9259E−03 | 7.4757E−04 | −5.4798E−04 | 3.1458E−04 |
| S10 | 5.6591E−03 | −2.5953E−03 | 7.8154E−04 | −2.5394E−04 |

TABLE 20-continued

| Surface No. | A22 | A24 | A26 | A28 |
|---|---|---|---|---|
| S1 | 0.0000E+00 | 0.0000E+00 | 0.0000E+00 | 0.0000E+00 |
| S2 | 0.0000E+00 | 0.0000E+00 | 0.0000E+00 | 0.0000E+00 |
| S3 | 0.0000E+00 | 0.0000E+00 | 0.0000E+00 | 0.0000E+00 |
| S4 | 0.0000E+00 | 0.0000E+00 | 0.0000E+00 | 0.0000E+00 |
| S5 | 0.0000E+00 | 0.0000E+00 | 0.0000E+00 | 0.0000E+00 |
| S6 | 0.0000E+00 | 0.0000E+00 | 0.0000E+00 | 0.0000E+00 |
| S7 | 0.0000E+00 | 0.0000E+00 | 0.0000E+00 | 0.0000E+00 |
| S8 | 0.0000E+00 | 0.0000E+00 | 0.0000E+00 | 0.0000E+00 |
| S9 | −1.0709E−04 | 9.3307E−05 | −1.5946E−05 | 1.6046E−05 |
| S10 | 1.1417E−05 | 6.9569E−05 | −2.8655E−05 | 9.9264E−05 |

Figure 20A:
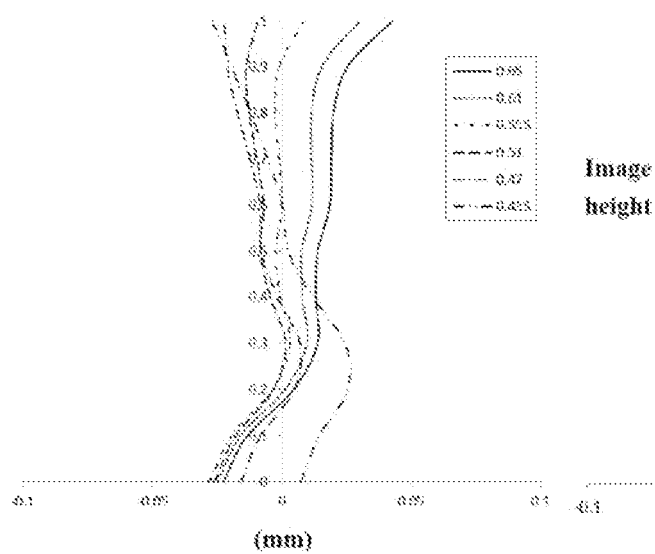
FIGS. 20A to 20D show a longitudinal aberration curve, astigmatism curve, distortion curve and lateral color curve of the optical imaging system according to Embodiment 10, respectively.
Figure 20B:
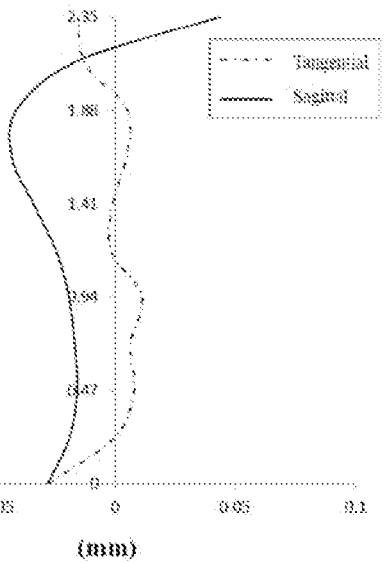
Figure 20C:
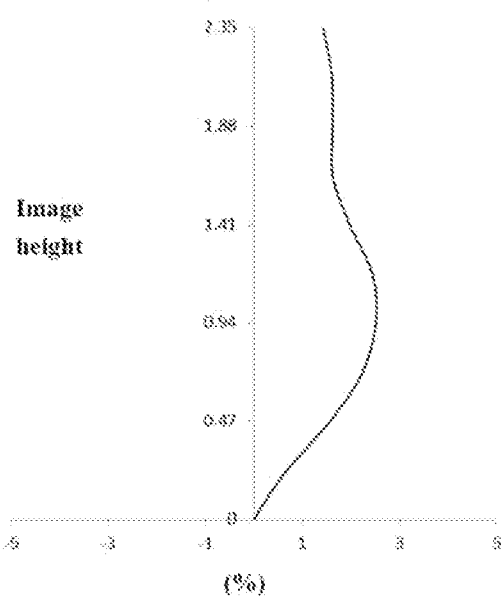
Figure 20D:
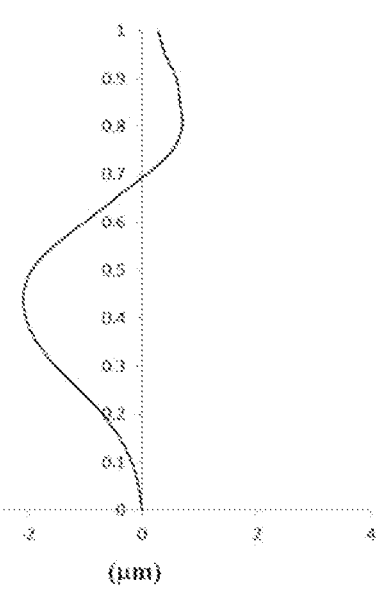

FIG. 20A shows a longitudinal aberration curve of the optical imaging system according to Embodiment 10, which represents the deviation of the converged focal point after light of different wavelengths passes through the lens assembly. FIG. 20B shows an astigmatism curve of the optical imaging system according to Embodiment 10, which represents the curvature of the tangential image plane and the curvature of the sagittal image plane. FIG. 20C shows a distortion curve of the optical imaging system according to Embodiment 10, which represents distortion magnitude values corresponding to different image heights. FIG. 20D shows a lateral color curve of the optical imaging system according to Embodiment 10, which represents the deviation of different image heights on the imaging plane after light passes through the lens assembly. According to FIGS. 20A to 20D, it can be seen that the optical imaging system given in Embodiment 10 can realize good imaging quality.

Embodiment 11

Figure 21:
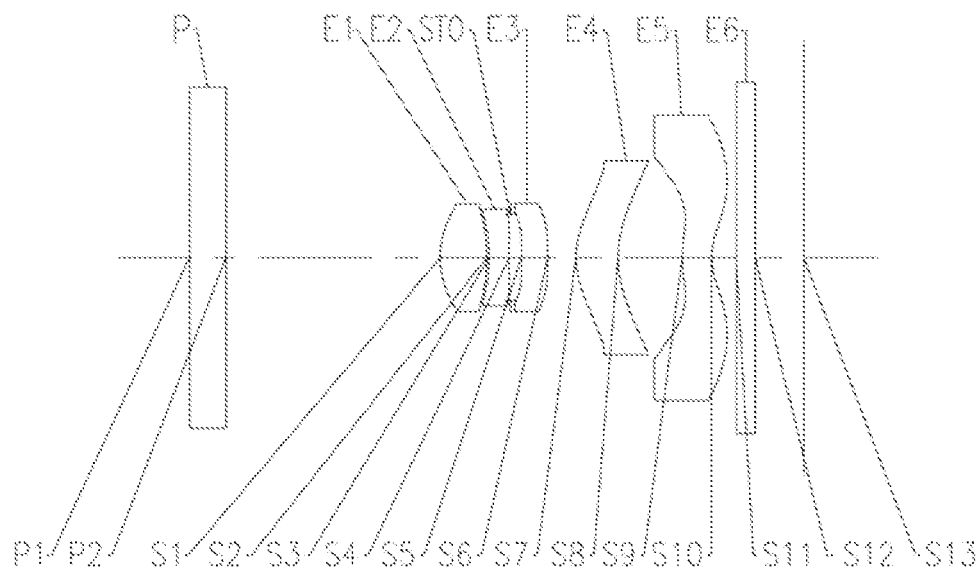
FIG. 21 shows a schematic structural diagram of an optical imaging system according to Embodiment 11 of the present application.

An optical imaging system according to Embodiment 11 of the present application will be described below with reference to FIGS. 21 to 22D. FIG. 21 shows a schematic structural diagram of the optical imaging system according to Embodiment 11 of the present application.

As shown in FIG. 21, the optical imaging system includes, in order from an object side to an image side along an optical axis: a planar glass P, a first lens E1, a second lens E2, a diaphragm STO, a third lens E3, a fourth lens E4, a fifth lens E5, a filter E6 and an imaging plane S13.

The first lens E1 has a positive focal power, and has a convex object side surface S1 and a convex image side surface S2. The second lens E2 has a negative focal power, and has a concave object side surface S3 and a concave image side surface S4. The third lens E3 has a positive focal power, and has a concave object side surface S5 and a convex image side surface S6. The fourth lens E4 has a positive focal power, and has a convex object side surface S7 and a concave image side surface S8. The fifth lens E5 has a negative focal power, and has a convex object side surface S9 and a concave image side surface S10. The filter E6 has an object side surface S11 and an image side surface S12. Light from an object sequentially passes through the respective surfaces S1 to S12 and finally forms an image on the imaging plane S13.

Table 21 shows a table of basic parameters of the optical imaging system of Embodiment 11, wherein the units of the radius of curvature, thickness, and focal length are all millimeters (mm). Table 22 shows higher-order coefficients of each aspheric lens surface that are applicable in Embodiment 11, wherein the surface profile of each aspheric surface can be defined by formula (1) given in Embodiment 1 described above.

TABLE 21

Embodiment 11: f = 1.10 mm, TL = 6.78 mm, FOV = 59.0°

| Surface No. | Surface type | Radius of curvature | Thickness | Material Refractive index | Dispersion coefficient | Focal length | Conic coefficient |
|---|---|---|---|---|---|---|---|
| OBJ | Spherical | Infinity | 0.0500 | | | | |
| P1 | Spherical | Infinity | 0.4000 | 1.517 | 64.20 | | |
| P2 | Spherical | Infinity | 2.3500 | | | | |
| S1 | Aspherical | 0.9496 | 0.5130 | 1.546 | 56.11 | 1.19 | −0.6934 |
| S2 | Aspherical | −1.6493 | 0.0250 | | | | −5.9787 |
| S3 | Aspherical | −1.5894 | 0.2200 | 1.678 | 19.25 | −1.94 | 5.4312 |
| S4 | Aspherical | 7.8740 | 0.0132 | | | | −26.6161 |
| STO | Spherical | Infinity | 0.1219 | | | | |
| S5 | Aspherical | −1000.0000 | 0.2876 | 1.666 | 20.40 | 11.95 | 99.9900 |
| S6 | Aspherical | −7.9025 | 0.3084 | | | | −66.7401 |
| S7 | Aspherical | 0.8317 | 0.4624 | 1.546 | 56.11 | 3.46 | −3.3522 |
| S8 | Aspherical | 1.1933 | 0.7053 | | | | −1.2190 |
| S9 | Aspherical | 1.2614 | 0.3200 | 1.536 | 55.74 | −2.88 | −19.3504 |
| S10 | Aspherical | 0.6329 | 0.2706 | | | | −2.0650 |
| S11 | Spherical | Infinity | 0.2100 | 1.517 | 64.20 | | |
| S12 | Spherical | Infinity | 0.5226 | | | | |
| S13 | Spherical | Infinity | | | | | |

TABLE 22

| Surface No. | A4 | A6 | A8 | A10 | A12 |
|---|---|---|---|---|---|
| S1 | −5.9506E−03 | −3.3289E−03 | −9.3208E−04 | −2.1059E−04 | −4.6646E−05 |
| S2 | 1.2679E−03 | −4.5045E−03 | 1.1585E−03 | −4.3216E−04 | 1.2659E−04 |
| S3 | 3.1646E−02 | 1.4600E−03 | 1.5263E−03 | −2.6887E−04 | 1.2598E−04 |
| S4 | −3.1164E−02 | −1.0312E−04 | −1.7471E−05 | −2.7918E−05 | 1.2118E−05 |
| S5 | −6.9932E−02 | −4.3326E−04 | 5.7672E−05 | 1.4654E−04 | 3.4517E−06 |
| S6 | −8.9982E−02 | 1.0148E−02 | 6.2520E−04 | 4.6445E−04 | 1.2850E−05 |
| S7 | −6.7951E−02 | 3.2367E−03 | 2.5804E−04 | 5.0068E−04 | −1.5255E−05 |
| S8 | −1.2704E−01 | 4.8066E−03 | 1.0266E−03 | −2.8903E−04 | 4.2984E−05 |
| S9 | −6.0416E−01 | 1.0484E−01 | −3.8940E−03 | −4.3394E−03 | 6.4514E−04 |
| S10 | −1.3208E+00 | 3.0838E−01 | −9.4050E−02 | 2.9868E−02 | −1.3194E−02 |

| Surface No. | A14 | A16 | A18 | A20 |
|---|---|---|---|---|
| S1 | −5.5012E−06 | −2.0758E−06 | 1.7313E−06 | 2.6082E−06 |
| S2 | −5.7174E−06 | 9.9125E−06 | −2.0088E−06 | 2.4501E−06 |
| S3 | 3.4920E−06 | 5.6731E−06 | 3.5874E−07 | 9.0321E−07 |
| S4 | 6.6008E−07 | 8.0432E−07 | −2.4671E−06 | 1.3758E−06 |
| S5 | 1.0448E−05 | −3.9283E−07 | 6.4449E−06 | 1.7065E−06 |
| S6 | 2.1112E−05 | 1.0931E−05 | 1.0458E−05 | 7.4963E−06 |
| S7 | 1.7628E−04 | −3.2265E−05 | −2.9219E−05 | −3.6193E−05 |
| S8 | 2.6514E−04 | −3.0470E−05 | −9.9636E−06 | −4.2783E−05 |
| S9 | −1.2749E−03 | 3.7158E−04 | −3.4734E−04 | 1.9295E−04 |
| S10 | 4.8474E−03 | −1.9956E−03 | 4.8474E−04 | −6.9987E−05 |

| Surface No. | A22 | A24 | A26 | A28 |
|---|---|---|---|---|
| S1 | 0.0000E+00 | 0.0000E+00 | 0.0000E+00 | 0.0000E+00 |
| S2 | 0.0000E+00 | 0.0000E+00 | 0.0000E+00 | 0.0000E+00 |
| S3 | 0.0000E+00 | 0.0000E+00 | 0.0000E+00 | 0.0000E+00 |
| S4 | 0.0000E+00 | 0.0000E+00 | 0.0000E+00 | 0.0000E+00 |
| S5 | 0.0000E+00 | 0.0000E+00 | 0.0000E+00 | 0.0000E+00 |
| S6 | 0.0000E+00 | 0.0000E+00 | 0.0000E+00 | 0.0000E+00 |
| S7 | 0.0000E+00 | 0.0000E+00 | 0.0000E+00 | 0.0000E+00 |
| S8 | 0.0000E+00 | 0.0000E+00 | 0.0000E+00 | 0.0000E+00 |
| S9 | 8.6641E−06 | 7.8278E−05 | 2.3685E−05 | −7.3753E−07 |
| S10 | −7.7746E−05 | 1.3345E−04 | −4.3684E−05 | 1.0924E−04 |

Figures 22A, 22B:
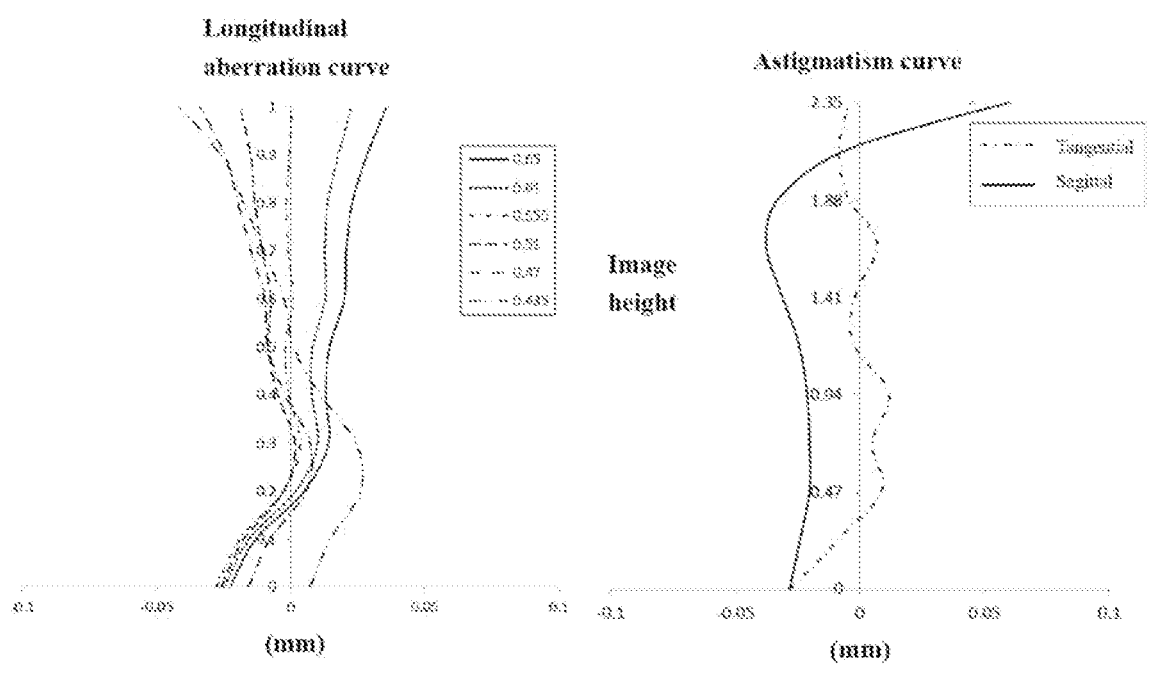
FIGS. 22A to 22D show a longitudinal aberration curve, astigmatism curve, distortion curve and lateral color curve of the optical imaging system according to Embodiment 11, respectively.
Figures 22C, 22D:
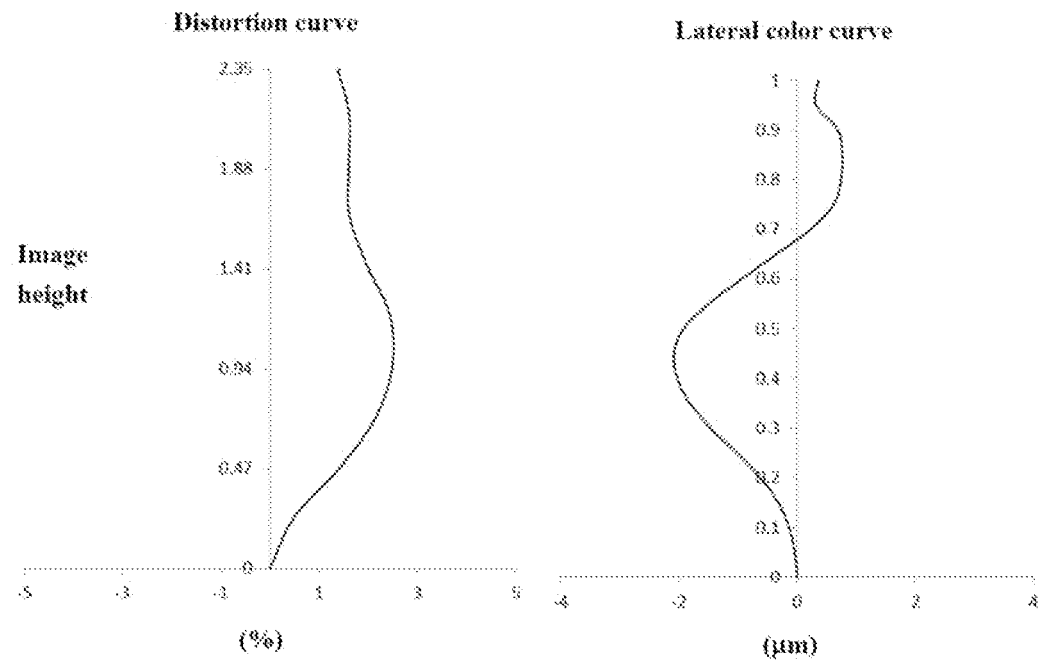

FIG. 22A shows a longitudinal aberration curve of the optical imaging system according to Embodiment 11, which represents the deviation of the converged focal point after light of different wavelengths passes through the lens assembly. FIG. 22B shows an astigmatism curve of the optical imaging system according to Embodiment 11, which represents the curvature of the tangential image plane and the curvature of the sagittal image plane. FIG. 22C shows a distortion curve of the optical imaging system according to Embodiment 11, which represents distortion magnitude values corresponding to different image heights. FIG. 22D shows a lateral color curve of the optical imaging system according to Embodiment 11, which represents the deviation of different image heights on the imaging plane after light passes through the lens assembly. According to FIGS. 22A to 22D, it can be seen that the optical imaging system given in Embodiment 11 can realize good imaging quality.

Embodiment 12

Figure 23:
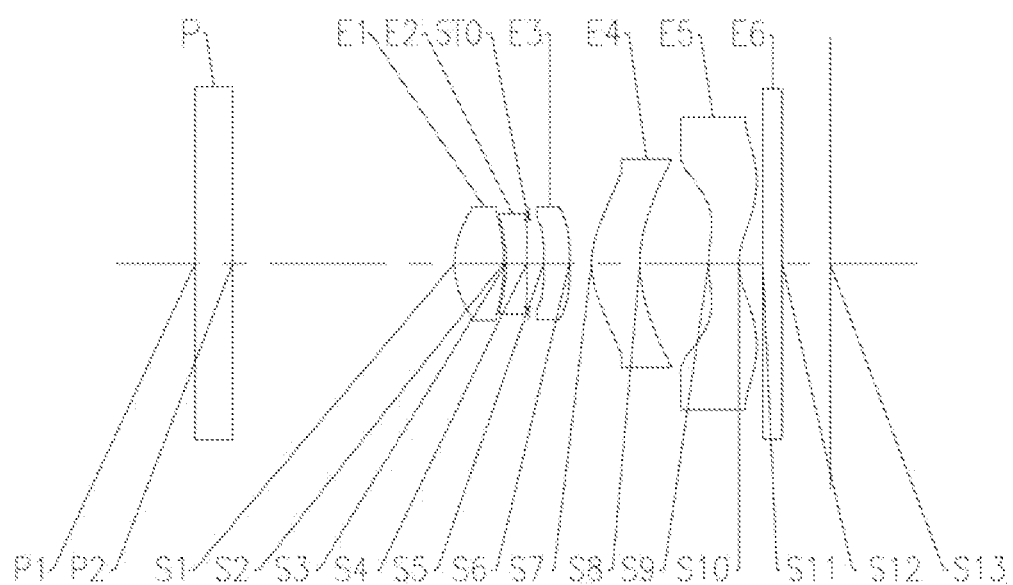
FIG. 23 shows a schematic structural diagram of an optical imaging system according to Embodiment 12 of the present application.

An optical imaging system according to Embodiment 12 of the present application will be described below with reference to FIGS. 23 to 24D. FIG. 23 shows a schematic structural diagram of the optical imaging system according to Embodiment 12 of the present application.

As shown in FIG. 23, the optical imaging system includes, in order from an object side to an image side along an optical axis: a planar glass P, a first lens E1, a second lens E2, a diaphragm STO, a third lens E3, a fourth lens E4, a fifth lens E5, a filter E6 and an imaging plane S13.

The first lens E1 has a positive focal power, and has a convex object side surface S1 and a convex image side surface S2. The second lens E2 has a negative focal power, and has a concave object side surface S3 and a concave image side surface S4. The third lens E3 has a negative focal power, and has a concave object side surface S5 and a convex image side surface S6. The fourth lens E4 has a positive focal power, and has a convex object side surface S7 and a concave image side surface S8. The fifth lens E5 has a negative focal power, and has a convex object side surface S9 and a concave image side surface S10. The filter E6 has an object side surface S11 and an image side surface S12. Light from an object sequentially passes through the respective surfaces S1 to S12 and finally forms an image on the imaging plane S13.

Table 23 shows a table of basic parameters of the optical imaging system of Embodiment 12, wherein the units of the radius of curvature, thickness, and focal length are all millimeters (mm). Table 24 shows higher-order coefficients of each aspheric lens surface that are applicable in Embodiment 12, wherein the surface profile of each aspheric surface can be defined by formula (1) given in Embodiment 1 described above.

TABLE 23

Embodiment 12: f = 1.09 mm, TL = 6.80 mm, FOV = 58.6°

| Surface No. | Surface type | Radius of curvature | Thickness | Material Refractive index | Dispersion coefficient | Focal length | Conic coefficient |
|---|---|---|---|---|---|---|---|
| OBJ | Spherical | Infinity | 0.0500 | | | | |
| P1 | Spherical | Infinity | 0.4000 | 1.517 | 64.20 | | |
| P2 | Spherical | Infinity | 2.3569 | | | | |
| S1 | Aspherical | 0.9374 | 0.5228 | 1.546 | 56.11 | 1.21 | −0.7128 |
| S2 | Aspherical | −1.7789 | 0.0250 | | | | −6.4892 |
| S3 | Aspherical | −1.6719 | 0.2200 | 1.678 | 19.25 | −2.06 | 5.7451 |
| S4 | Aspherical | 8.9124 | 0.0209 | | | | 69.1596 |
| STO | Spherical | Infinity | 0.1604 | | | | |
| S5 | Aspherical | −22.0000 | 0.2746 | 1.666 | 20.40 | −5136.22 | 99.9900 |
| S6 | Aspherical | −22.2528 | 0.2334 | | | | 99.9900 |
| S7 | Aspherical | 0.8308 | 0.5151 | 1.546 | 56.11 | 2.68 | −3.6757 |
| S8 | Aspherical | 1.5017 | 0.7307 | | | | −0.5181 |
| S9 | Aspherical | 1.2436 | 0.3200 | 1.536 | 55.74 | −2.58 | −30.9444 |
| S10 | Aspherical | 0.5958 | 0.2532 | | | | −1.9545 |
| S11 | Spherical | Infinity | 0.2100 | 1.517 | 64.20 | | |
| S12 | Spherical | Infinity | 0.5069 | | | | |
| S13 | Spherical | Infinity | | | | | |

TABLE 24

| Surface No. | A4 | A6 | A8 | A10 | A12 |
|---|---|---|---|---|---|
| S1 | −8.4856E−03 | −4.7433E−03 | −1.2544E−03 | −2.2545E−04 | −2.2088E−05 |
| S2 | −2.0728E−03 | −3.8540E−03 | 1.2929E−03 | −3.2345E−04 | 9.7592E−05 |
| S3 | 2.9143E−02 | 2.0971E−03 | 1.4163E−03 | −2.2254E−04 | 8.1164E−05 |
| S4 | −2.2384E−02 | −6.9419E−05 | −1.1652E−04 | −5.4958E−05 | 2.4127E−06 |
| S5 | −7.1264E−02 | −2.1492E−03 | −5.2500E−04 | −2.2896E−05 | −4.8219E−05 |
| S6 | −1.2036E−01 | 1.0414E−02 | −1.7892E−04 | 5.1619E−04 | −3.8241E−05 |
| S7 | −4.7968E−02 | 4.7804E−03 | −2.8286E−03 | 2.2754E−03 | −3.9330E−04 |
| S8 | −1.0384E−01 | 3.5206E−03 | 2.1209E−03 | −1.9695E−03 | −2.4335E−04 |
| S9 | −6.7461E−01 | 2.0066E−01 | 4.6598E−03 | −1.4024E−02 | 1.1602E−04 |
| S10 | −1.3034E+00 | 3.3456E−01 | −8.3598E−02 | 3.6149E−02 | −1.5111E−02 |

| Surface No. | A14 | A16 | A18 | A20 |
|---|---|---|---|---|
| S1 | 1.2662E−05 | 7.3881E−06 | 4.9846E−06 | 2.0912E−06 |
| S2 | 1.7193E−07 | 9.4147E−07 | 8.9487E−07 | 3.4358E−06 |
| S3 | 2.9253E−06 | −3.3752E−06 | 2.0416E−06 | −4.0765E−07 |
| S4 | 1.2029E−06 | 1.5266E−06 | −2.0104E−06 | −4.6053E−08 |
| S5 | −1.0363E−05 | −1.0872E−05 | −1.9981E−06 | −1.7252E−06 |
| S6 | 1.5587E−05 | −8.2079E−06 | −2.7544E−06 | 1.1294E−06 |
| S7 | 1.2010E−04 | −7.9980E−05 | 1.1089E−05 | −1.8932E−05 |
| S8 | 1.2623E−04 | −3.7356E−05 | 5.2637E−05 | −5.8507E−06 |
| S9 | −1.5498E−03 | 2.0612E−03 | −7.9766E−04 | 4.1025E−04 |
| S10 | 5.8801E−03 | −2.2492E−03 | 9.4620E−04 | −3.2997E−04 |

| Surface No. | A22 | A24 | A26 | A28 |
|---|---|---|---|---|
| S1 | 0.0000E+00 | 0.0000E+00 | 0.0000E+00 | 0.0000E+00 |
| S2 | 0.0000E+00 | 0.0000E+00 | 0.0000E+00 | 0.0000E+00 |
| S3 | 0.0000E+00 | 0.0000E+00 | 0.0000E+00 | 0.0000E+00 |
| S4 | 0.0000E+00 | 0.0000E+00 | 0.0000E+00 | 0.0000E+00 |
| S5 | 0.0000E+00 | 0.0000E+00 | 0.0000E+00 | 0.0000E+00 |
| S6 | 0.0000E+00 | 0.0000E+00 | 0.0000E+00 | 0.0000E+00 |
| S7 | 0.0000E+00 | 0.0000E+00 | 0.0000E+00 | 0.0000E+00 |
| S8 | 0.0000E+00 | 0.0000E+00 | 0.0000E+00 | 0.0000E+00 |
| S9 | −2.3798E−04 | 1.1463E−04 | −7.5492E−05 | 2.7475E−05 |
| S10 | 8.2654E−05 | −3.3987E−06 | −1.3907E−05 | 2.1391E−05 |

FIG. 24A shows a longitudinal aberration curve of the optical imaging system according to Embodiment 12, which represents the deviation of the converged focal point after light of different wavelengths passes through the lens assembly. FIG. 24B shows an astigmatism curve of the optical imaging to system according to Embodiment 12, which represents the curvature of the tangential image plane and the curvature of the sagittal image plane. FIG. 24C shows a distortion curve of the optical imaging system according to Embodiment 12, which represents distortion magnitude values corresponding to different image heights. FIG. 24D shows a lateral color curve of the optical imaging system according to Embodiment 12, which represents the deviation of different image heights on the imaging plane after light passes through the lens assembly. According to FIGS. 24A to 24D, it can be seen that the optical imaging system given in Embodiment 12 can realize good imaging quality.

In summary, Embodiments 1 to 12 satisfy the relationships shown in Table 25, respectively.

TABLE 25

| Conditional expression | Embodiment | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| R3/R4 | −0.04 | −0.27 | −0.41 | −0.04 | −0.16 | −0.002 | −0.27 | −0.45 | −0.40 | −0.32 | −0.20 | −0.19 |
| ImgH/Do | 1.18 | 1.14 | 1.16 | 1.07 | 1.08 | 1.03 | 1.40 | 1.24 | 1.28 | 1.23 | 1.24 | 1.26 |
| EPD/ImgH | 0.76 | 0.81 | 0.80 | 0.73 | 0.69 | 0.68 | 0.70 | 0.55 | 0.55 | 0.53 | 0.52 | 0.52 |
| f/EPD | 0.89 | 0.82 | 1.02 | 0.98 | 1.05 | 1.10 | 0.75 | 0.84 | 0.86 | 0.86 | 0.88 | 0.87 |
| f/BFL | 1.29 | 1.45 | 1.23 | 1.33 | 1.28 | 1.22 | 1.01 | 1.16 | 1.31 | 1.10 | 1.10 | 1.12 |
| R1/R2 | −0.93 | −0.84 | −0.84 | −0.88 | −0.92 | −0.91 | −0.64 | −0.58 | −0.57 | −0.59 | −0.58 | −0.53 |
| f/f12 | 0.65 | 0.63 | 0.71 | 0.68 | 0.68 | 0.74 | 0.33 | 0.38 | 0.41 | 0.44 | 0.49 | 0.50 |
| To/EPD | 2.34 | 2.38 | 2.34 | 2.59 | 2.55 | 2.73 | 1.82 | 2.26 | 2.18 | 2.23 | 2.24 | 2.24 |
| T34/CT4 | 1.38 | 1.61 | 1.24 | 0.87 | 1.07 | 0.38 | 0.94 | 0.67 | 0.69 | 0.68 | 0.67 | 0.45 |
| R5/|R6| | 1.04 | 0.89 | 0.97 | 1.17 | 1.12 | 0.34 | | | | | | |
| f2/R5 | −2.76 | −2.35 | −2.40 | −2.58 | −2.36 | −0.33 | | | | | | |
| f4/f5 | | | | | | | −1.24 | −1.43 | −1.30 | −1.32 | −1.20 | −1.04 |
| f/R7 + f/R8 | | | | | | | 2.25 | 1.94 | 1.41 | 2.05 | 2.25 | 2.03 |

The present application further provides an imaging apparatus, of which an electronic photosensitive element may be a photosensitive coupling element (CCD) or a complementary metal oxide semiconductor element (CMOS). The imaging apparatus may be an independent imaging device such as a digital camera, or may be an imaging module integrated in a mobile electronic device such as a mobile phone. The imaging apparatus is equipped with the optical imaging system described above.

The above description is only the preferred embodiments of the present application and the explanation of the applied technical principle. It should be understood by those skilled in the art that the scope involved in the present application is not limited to technical solutions formed by specific combinations of the above technical features, and at the same time, should also cover other technical solutions formed by any combination of the above technical features or equivalent features thereof without departing from the concept of the disclosure. For example, the above features and (but not limited to) the technical features with similar functions disclosed in the present application are replaced with each other to form technical solutions.

The invention claimed is:

1. An optical imaging system, comprising, in order from an object side to an image side along an optical axis:
   a planar glass;
   a first lens having a positive focal power;
   a second lens having a negative focal power; and
   a plurality of subsequent lenses having a respective focal power;
   wherein the maximum field of view FOV of the optical imaging system satisfies FOV≥40°; and
   a radius of curvature R3 of an object side surface of the second lens and a radius of curvature R4 of an image side surface of the second lens satisfy −0.5<R3/R4<0; wherein a total effective focal length f of the optical imaging system and an entrance pupil diameter EPD of the optical imaging system satisfy f/EPD<1.2.

2. The optical imaging system according to claim 1, wherein a distance TL from a subject to an imaging plane of the optical imaging system on the optical axis satisfies TL≤7.0 mm.

3. The optical imaging system according to claim 1, wherein the maximum image height ImgH of the optical imaging system and the maximum height Do of the subject satisfy ImgH/Do≥1.0.

4. The optical imaging system according to claim 1, wherein the entrance pupil diameter EPD of the optical imaging system and the maximum image height ImgH of the optical imaging system satisfy 0.5<EPD/ImgH<1.0.

5. The optical imaging system according to claim 1, wherein the total effective focal length f of the optical imaging system and a distance BFL from an image side surface of a lens closest to an imaging plane of the optical imaging system to the imaging plane on the optical axis satisfy f/BFL≥1.0.

6. The optical imaging system according to claim 1, wherein a radius of curvature R1 of an object side surface of the first lens and a radius of curvature R2 of an image side surface of the first lens satisfy −1.0≤R1/R2≤−0.5.

7. The optical imaging system according to claim 1, wherein the total effective focal length f of the optical imaging system, and a combined focal length f12 of the first lens and the second lens satisfy 0.3≤f/f12<1.0.

8. The optical imaging system according to claim 1, wherein a distance To from the subject to an object side surface of the first lens on the optical axis and the entrance pupil diameter EPD of the optical imaging system satisfy 1.8≤To/EPD<3.0.

9. The optical imaging system according to claim 1, wherein the plurality of subsequent lenses of the optical imaging system comprise a third lens and a fourth lens, and
   a spacing distance T34 between the third lens and the fourth lens on the optical axis and a center thickness CT4 of the fourth lens on the optical axis satisfy 0.3≤T34/CT4<2.0.

10. The optical imaging system according to claim 9, wherein a radius of curvature R5 of an object side surface of the third lens and a radius of curvature R6 of an image side surface of the third lens satisfy 0<R5/R6|<1.5.

11. The optical imaging system according to claim 9, wherein an effective focal length f2 of the second lens and a radius of curvature R5 of an object side surface of the third lens satisfy −3.0<f2/R5<0.

12. The optical imaging system according to claim 1, wherein the plurality of subsequent lenses of the optical imaging system comprise a third lens, a fourth lens and a fifth lens, and an effective focal length f4 of the fourth lens and an effective focal length f5 of the fifth lens satisfy $-1.5 < f4/f5 \leq -1.0$.

13. The optical imaging system according to claim 12, wherein the total effective focal length f of the optical imaging system, a radius of curvature R7 of an object side surface of the fourth lens and a radius of curvature R8 of an image side surface of the fourth lens satisfy $1.0 < f/R7 + f/R8 < 2.5$.

14. An optical imaging system, comprising, in order from an object side to an image side along an optical axis:
    a planar glass;
    a first lens having a positive focal power;
    a second lens having a negative focal power; and
    a plurality of subsequent lenses having a respective focal power;
    wherein the maximum field of view FOV of the optical imaging system satisfies $FOV \geq 40°$; and
    the maximum image height ImgH of the optical imaging system and the maximum height Do of a subject satisfy $ImgH/Do \geq 1.0$.

15. The optical imaging system according to claim 14, wherein a distance TL from the subject to an imaging plane of the optical imaging system on the optical axis satisfies $TL \leq 7.0$ mm.

16. The optical imaging system according to claim 14, wherein an entrance pupil diameter EPD of the optical imaging system and the maximum image height ImgH of the optical imaging system satisfy $0.5 < EPD/ImgH < 1.0$.

17. The optical imaging system according to claim 14, wherein a total effective focal length f of the optical imaging system and an entrance pupil diameter EPD of the optical imaging system satisfy $f/EPD < 1.2$.

18. The optical imaging system according to claim 14, wherein the plurality of subsequent lenses of the optical imaging system comprise a third lens and a fourth lens, and
    a spacing distance T34 between the third lens and the fourth lens on the optical axis and a center thickness CT4 of the fourth lens on the optical axis satisfy $0.3 \leq T34/CT4 < 2.0$.

19. The optical imaging system according to claim 14, wherein the plurality of subsequent lenses of the optical imaging system comprise a third lens, a fourth lens and a fifth lens, and
    an effective focal length f4 of the fourth lens and an effective focal length f5 of the fifth len satisfy $-1.5 < f4/f5 \leq -1.0$.

* * * * *